(12) United States Patent
Brucato et al.

(10) Patent No.: US 11,266,962 B2
(45) Date of Patent: Mar. 8, 2022

(54) MULTIFUNCTION REACTOR

(71) Applicant: ARCHIMEDE S.R.L., Caltanissetta (IT)

(72) Inventors: Alberto Brucato, Caltanissetta (IT); Giuseppe Caputo, Caltanissetta (IT); Franco Grisafi, Caltanissetta (IT); Francesca Scargiali, Caltanissetta (IT); Gianluca Minelli, Caltanissetta (IT); Gaetano Tuzzolino, Caltanissetta (IT); Calogero Gattuso, Caltanissetta (IT); Roberto Rizzo, Caltanissetta (IT); Marialaura Alessi, Caltanissetta (IT); Fabio Santoro, Caltanissetta (IT)

(73) Assignee: Archimede S.R.L., Caltanissetta (IT)

(*) Notice: Subject to any disclaimer, the term of this patent is extended or adjusted under 35 U.S.C. 154(b) by 4 days.

(21) Appl. No.: 16/073,919

(22) PCT Filed: Jan. 27, 2017

(86) PCT No.: PCT/IB2017/050448
§ 371 (c)(1),
(2) Date: Jul. 30, 2018

(87) PCT Pub. No.: WO2017/130152
PCT Pub. Date: Aug. 3, 2017

(65) Prior Publication Data
US 2019/0039036 A1 Feb. 7, 2019

(30) Foreign Application Priority Data

Jan. 29, 2016 (IT) .............................. 102016009465
Jan. 29, 2016 (IT) .............................. 102016009481
Jan. 29, 2016 (IT) .............................. 102016009512

(51) Int. Cl.
*B01J 3/00* (2006.01)
*B01J 3/02* (2006.01)
(Continued)

(52) U.S. Cl.
CPC .............. *B01J 3/008* (2013.01); *B01J 3/002* (2013.01); *B01J 3/02* (2013.01); *B01J 19/2415* (2013.01);
(Continued)

(58) Field of Classification Search
CPC ..... B01J 3/002; B01J 3/008; B01J 3/02; B01J 19/2415; B01J 2219/00085;
(Continued)

(56) References Cited

U.S. PATENT DOCUMENTS 5,358,646 A 10/1994 Gloyna et al.
5,591,415 A 1/1997 Dassel et al.
(Continued)

FOREIGN PATENT DOCUMENTS

WO 2016085749 A1 6/2016

OTHER PUBLICATIONS

International Search Report, dated Jun. 1, 2017(PCT/IB2017/050448).
(Continued)

*Primary Examiner* — Hayden Brewster
(74) *Attorney, Agent, or Firm* — Robert L. Stearns; Dickinson Wright, PLLC

(57) ABSTRACT

Described herein is a reactor (1) includes:
a first reaction volume (V1),
a second reaction volume (V2),
wherein:
the first reaction volume (V1) is in fluid communication with an inlet port for an oxidizer agent (OX_IN), an
(Continued)

inlet port for at least one first reactant (R1_IN) and an outlet port for at least one reaction product (P1_OUT), said second reaction volume (V2) is in fluid communication with an inlet port for at least one second reactant (R2_IN), an outlet port for at least one second reaction product (P2_OUT) and is furthermore in thermal exchange relationship with said first reaction volume (V1), wherein, during operation, in said first reaction volume (V1) an oxidation reaction occurs between said at least one first reactant and said oxidizer agent with the formation of said at least one first reaction product, and in said second reaction volume (V2) a gasification reaction occurs of said second reactant with the contribution of a thermal energy flow exchanged between the first and the second reaction volumes (V1, V2) with formation of said at least one second reaction product.

18 Claims, 22 Drawing Sheets

(51) Int. Cl.
*C02F 11/08* (2006.01)
*B01J 19/24* (2006.01)

(52) U.S. Cl.
CPC ... *C02F 11/086* (2013.01); *B01J 2219/00085* (2013.01); *B01J 2219/00117* (2013.01); *B01J 2219/00159* (2013.01); *Y02P 20/54* (2015.11)

(58) Field of Classification Search
CPC ... B01J 2219/00117; B01J 2219/00159; C02F 11/06; C02F 11/08; C02F 11/086; Y02P 20/544
See application file for complete search history.

(56) References Cited

U.S. PATENT DOCUMENTS

| | | |
|---|---|---|
| 5,670,040 A | 9/1997 | Ahluwalia |
| 5,804,066 A | 9/1998 | Mueggenburg et al. |
| 2005/0054891 A1 | 3/2005 | Akai et al. |
| 2909/0206007 | 8/2009 | Allam |
| 2016/0145499 A1 | 5/2016 | Choi et al. |

OTHER PUBLICATIONS

M. Dolores Bermejo et al: "Experimental Performance and Modeling of a New Cooled-Wall Reactor for the Supercritical Water Oxidation". Industrial & Engineering Chemistry Research, vol. 48, No. 13, Jul. 1, 2009 (Jul. 1, 2009), pp. 6262-6272, XP055109127, ISSN: 0888-5885, DOI: 10.1021/ie900054e, pp. 6263-6265: "Experimental section", Schemes 1-4.

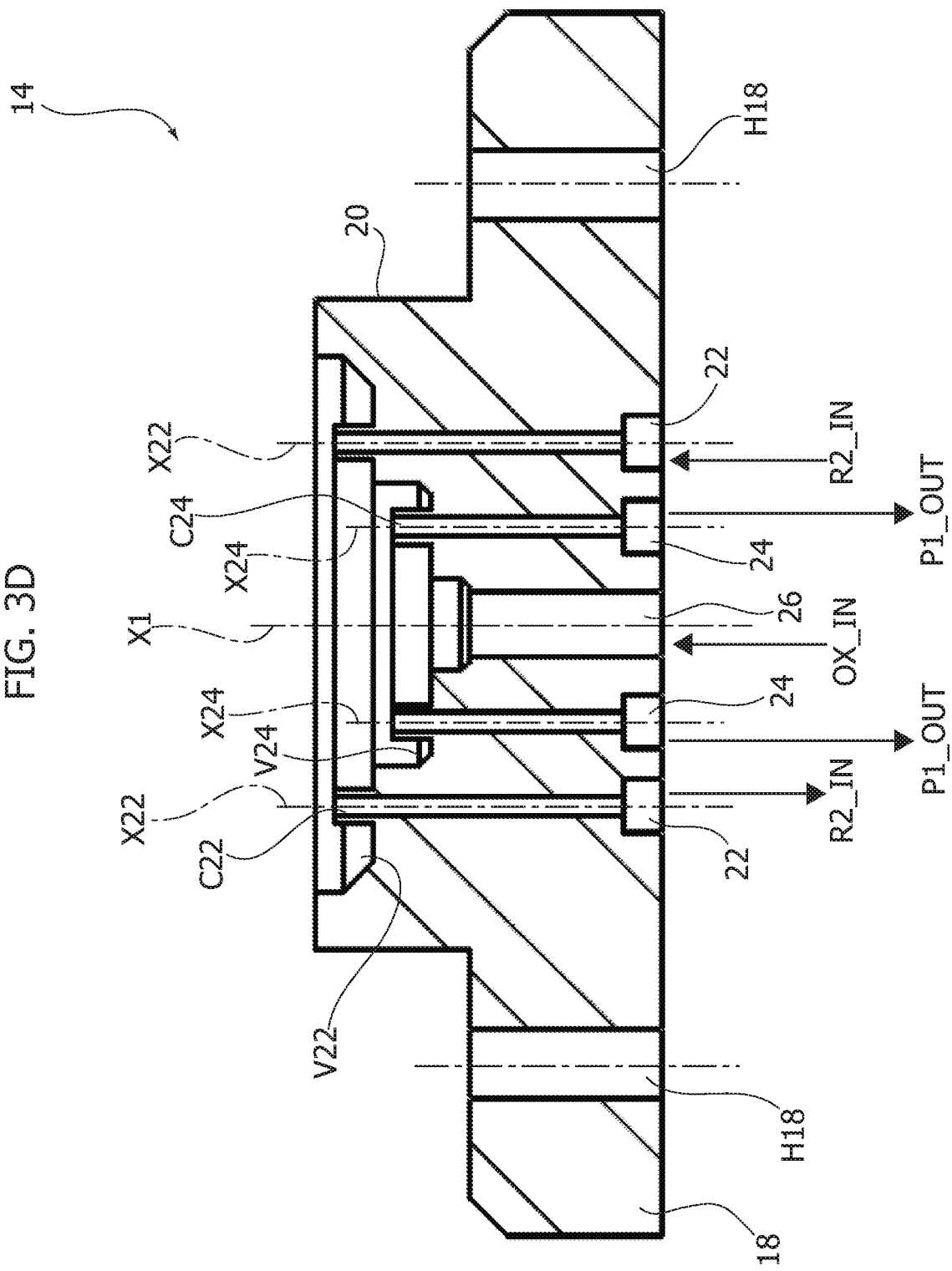

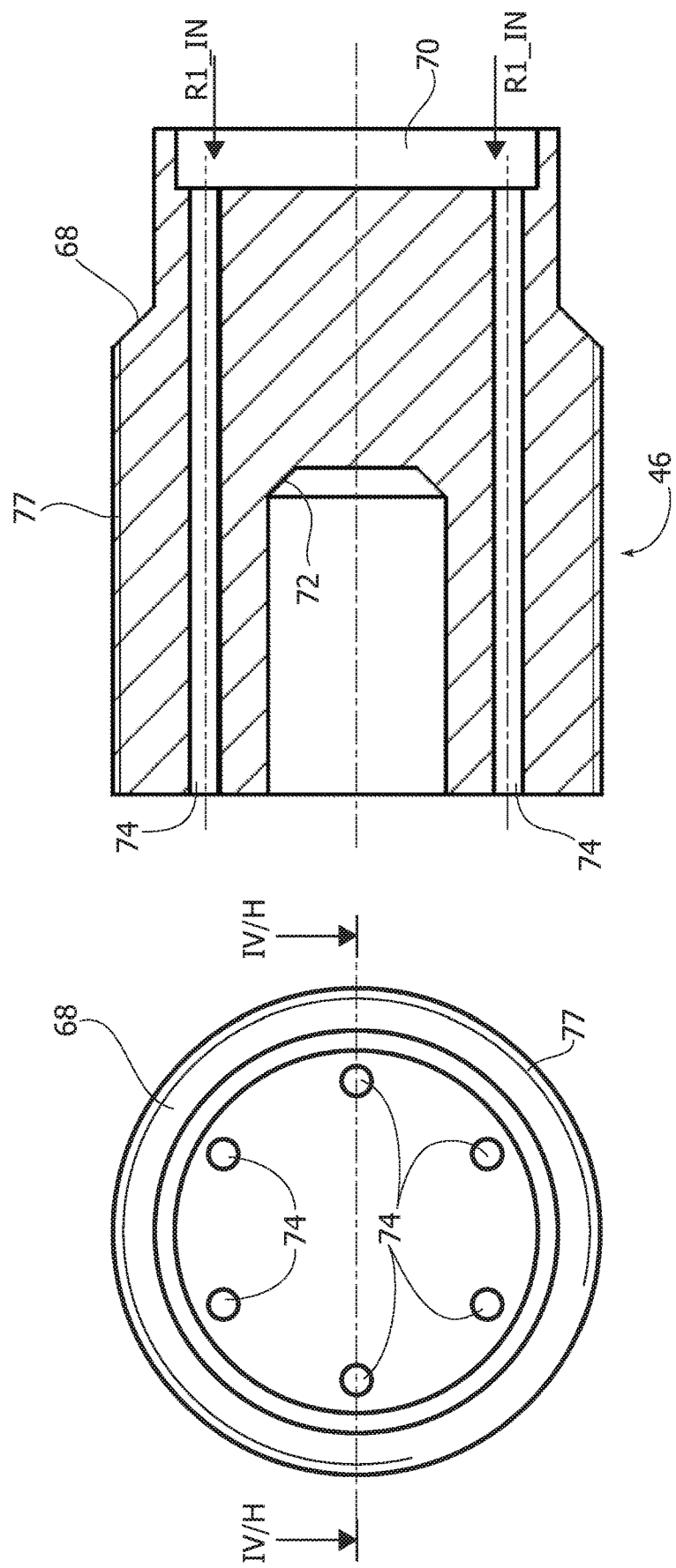

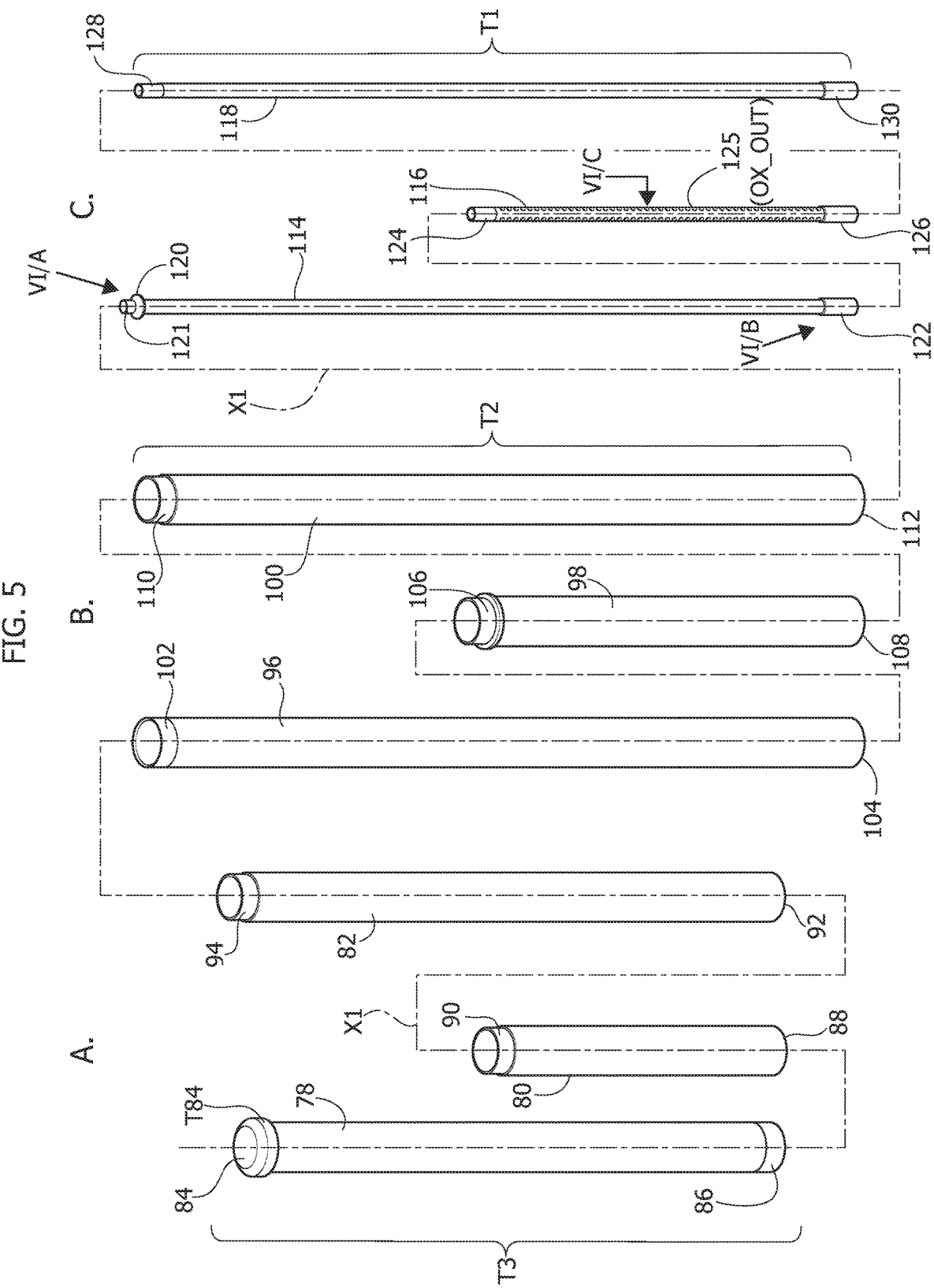

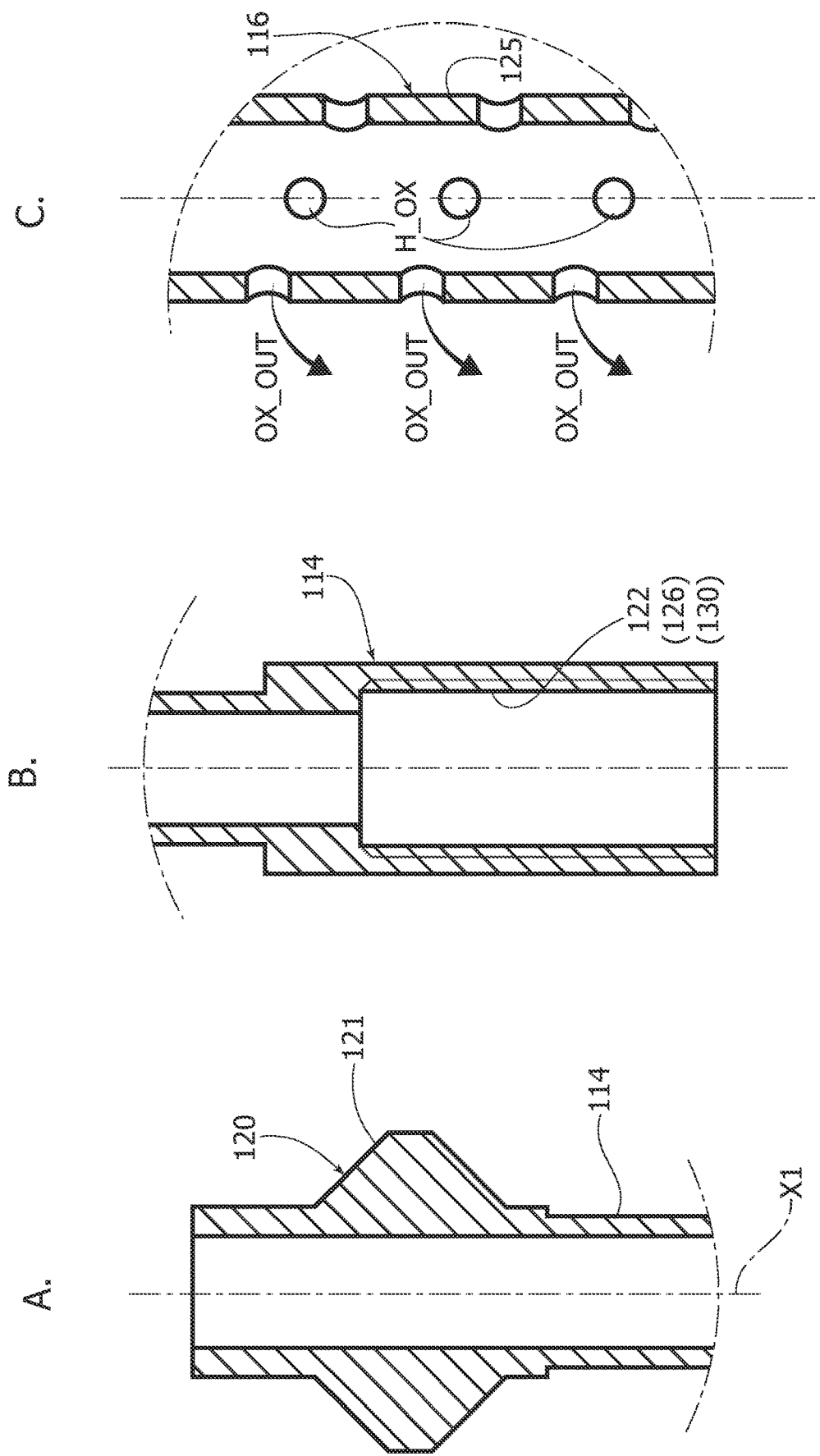

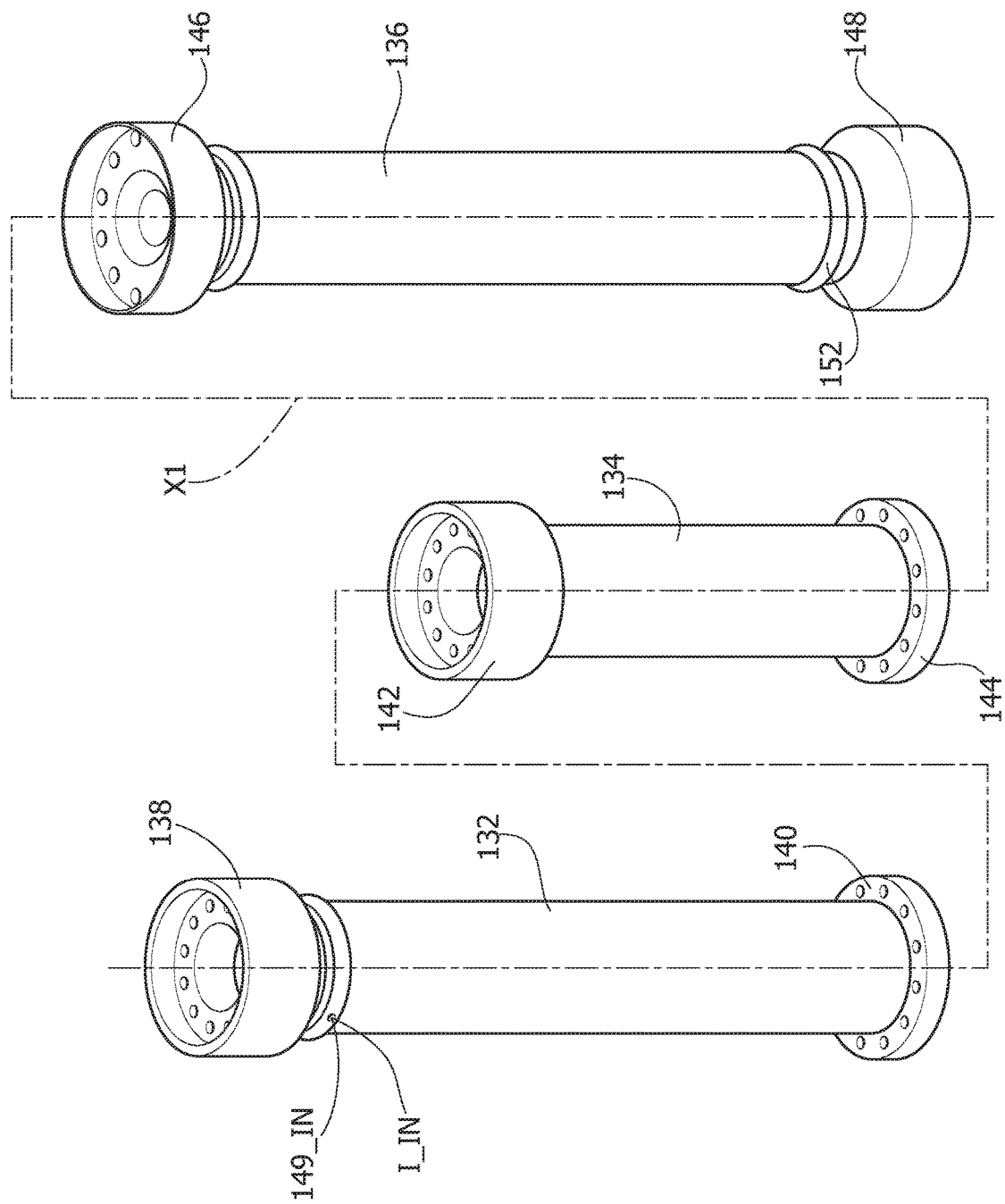

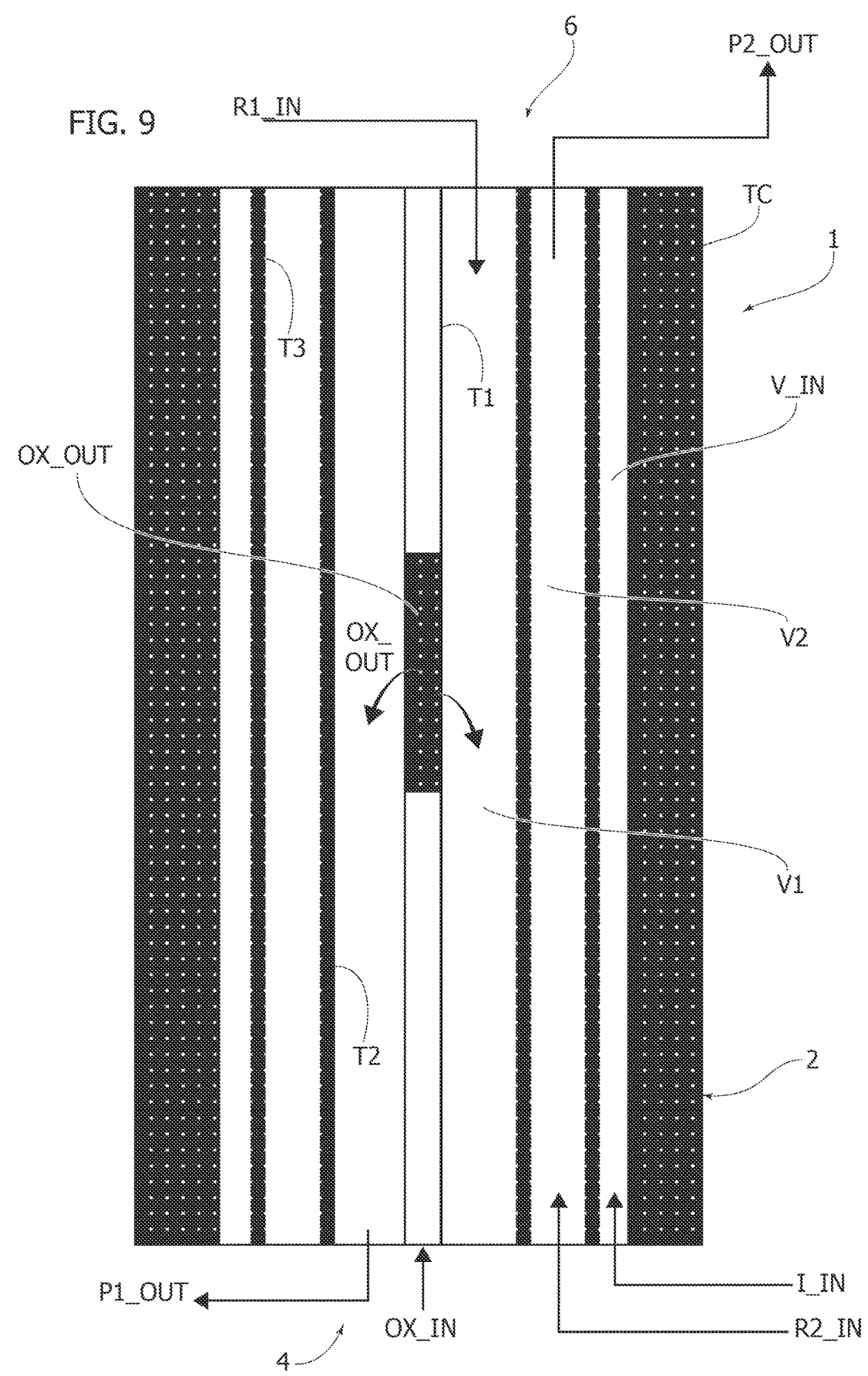

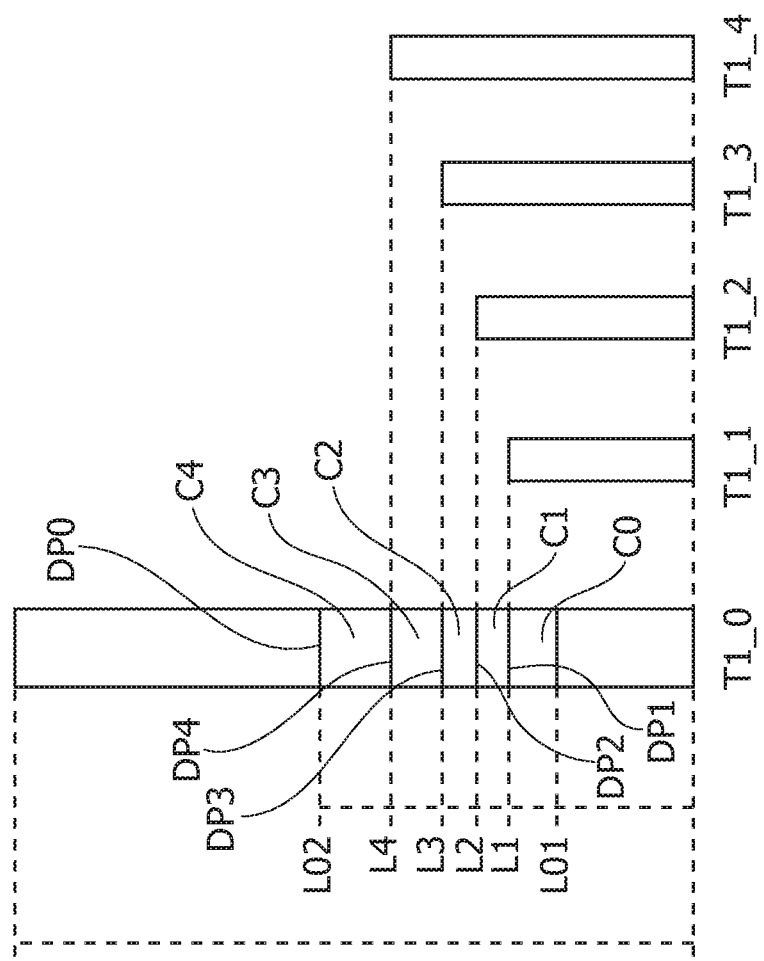

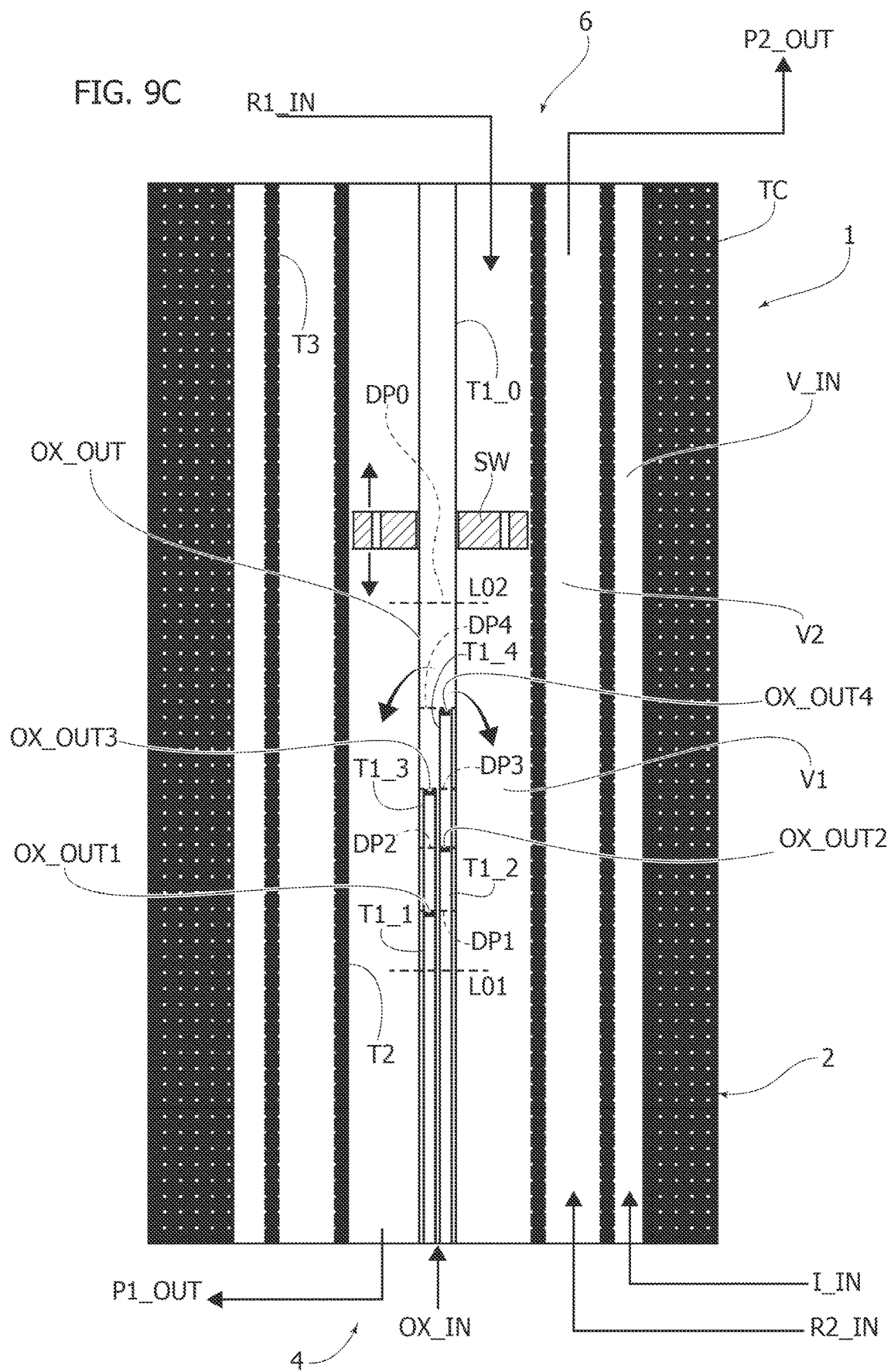

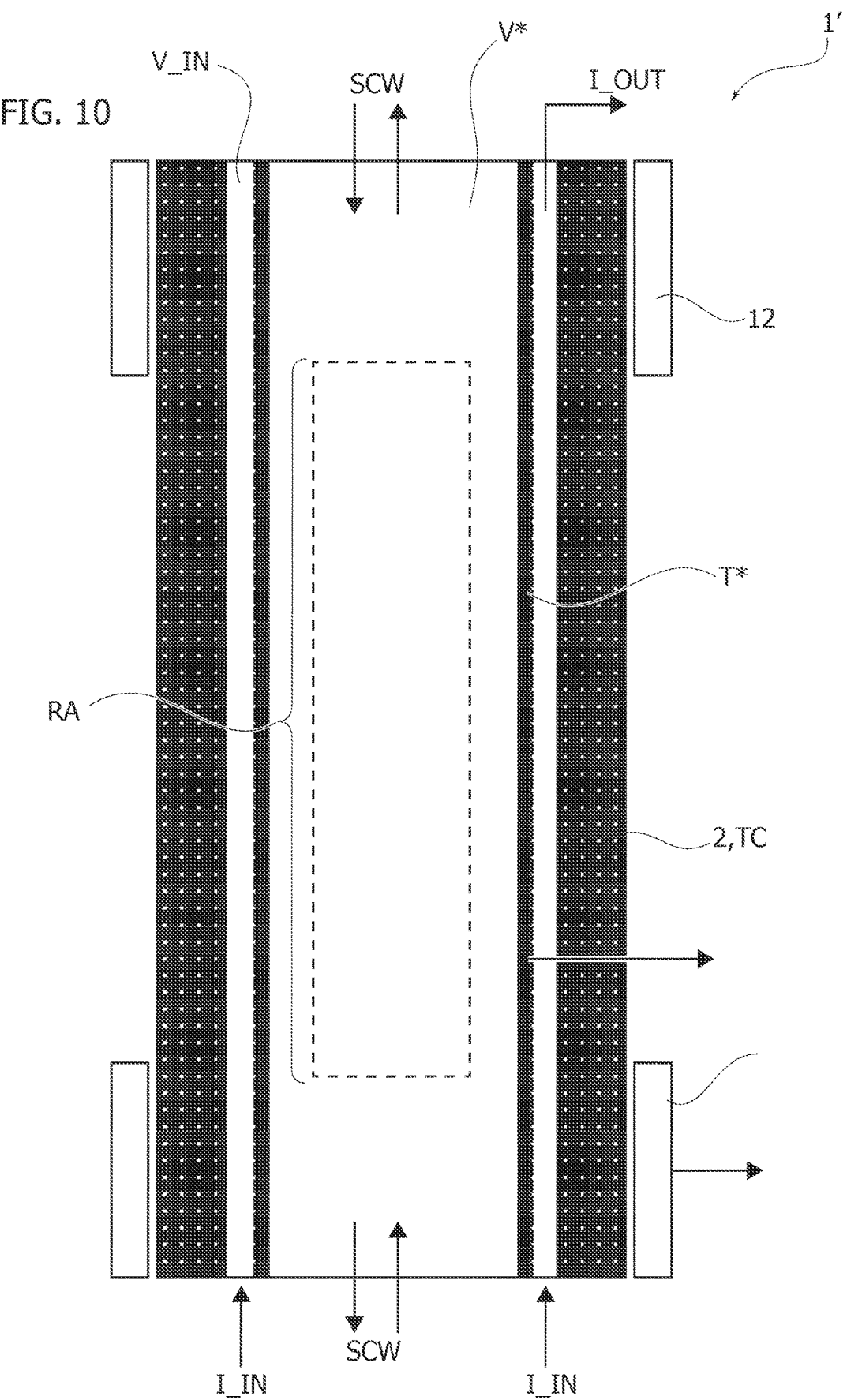

MULTIFUNCTION REACTOR

BACKGROUND

1. Technical Field

The present invention relates to chemical reactors, in particular for the treatment of waste and waste by means of processes of oxidation in supercritical water or gasification in supercritical water.

2. Related Art

Dangerous and special wastes cannot be destroyed in a safe and environmentally compatible way via common thermal and biological treatments. Some experimental studies show that the methods based upon reactions in supercritical water (at a pressure higher than 220 bar and a temperature higher than 374° C.) offer a valid alternative to the treatment of these types of waste, to the advantage of compatibility in environmental terms and in terms of health.

The effectiveness of the reactions in supercritical water is linked to the property of water above the critical point, low density, low dielectric constant, and low ion product, which render it a solvent with a non-polar and highly reactive nature. Consequently, organic species, also the ones with high molecular weight such as polymers, and gaseous species are completely soluble in water where they form a single fluid phase. Thanks to the substantial absence of limitations to transport of the chemical species between the phases, and to the high reactivity of the water molecules it is possible to reach high speeds of reactions of a radical nature. These reactions may be exploited in two types of processes, namely:

gasification processes, in which the organic substance (biomasses, solvents, oils, etc.) dissolved in water is brought to a high temperature (400-700° C.) and high pressure (p>220 bar) in the absence of oxygen, giving rise to gasification reactions that produce permanent gases such as hydrogen, methane, carbon monoxide, and carbon dioxide; and oxidation processes, in which the organic substance dissolved in water is brought to a high temperature (400-700° C.) and high pressure (p>220 bar) in the presence of oxygen, giving rise to oxidation reactions that convert practically all the carbon present into carbon dioxide, as in normal combustion.

In both cases, the nitrogen that is present is converted into $N_2$ and $N_2O$, without formation of nitrogen oxides ($NO_x$); heteroatoms such as Cl, S, P, are converted into the corresponding mineral acids (HCl, $H_3PO_4$, and $H_2SO_4$), which at the end of the process are isolated in liquid aqueous phase, where they can easily be neutralized without any dangerous and noxious emission into the atmosphere.

A first limit of the above processes of reaction is, to be precise, formation of mineral acids, which create an extremely aggressive reaction environment in regard to the materials of which the reactors are made. The combined effect of high temperature and high pressure with an acid environment subjects the materials to significant stresses, which can be minimized only with extremely high production costs, for example with the use of nickel-chrome alloys or application of protective coatings on steels. It is to be noted that in the first case the cost of the reactor rises in so far as it is necessary to use a large amount of high-quality material in order to guarantee the structural strength required for the various components.

The aggressiveness of the reaction environment and the thermal stresses are only part of the problem that affects the materials of which the reactors are made. In particular, it is the pressure forces that develop within the reactor that constitute one of the most serious constraints in terms of cost, especially in combination with the needs of resistance to corrosion and to the high temperatures referred to above. Providing a reactor made of alloy with high resistance both to mechanical stresses and to corrosion leads to a marked increase in production costs.

A further limit of these processes is the formation of salts in the reaction environment. Inorganic salts are in fact soluble in water at low temperature, but become insoluble in the supercritical reaction environment where by precipitating they produce fouling of the reactor and possibly obstruction of the ducts and of the working ports.

Finally, the processes of oxidation in supercritical water and gasification in supercritical water are very seldom used in combination with one another and even more seldom when combined to provide a synergy or integration that goes beyond the mere connection in series of the two processes. This constitutes a further limit to the development of these treatment processes in so far as the global efficiency thereof is lower than what could be obtained, and there likewise follows a structural complication of the treatment plant, which once again does not render adoption of these processes competitive at an industrial scale.

SUMMARY

The object of the present invention is to overcome the technical problems mentioned previously. In particular, falling within the objects of the invention are:

i) providing a reactor with improved characteristics of strength and resistance to corrosion and high temperatures, without impacting on the cost of production thereof;

ii) providing a reactor substantially insensitive to the problems of clogging by the precipitated salts; and iii) maximizing the efficiency of the processes of oxidation and gasification in supercritical water, in particular for the treatment of waste of any kind.

The invention relates to a reactor having the features forming the subject of one or more of the ensuing claims, which form an integral part of the technical disclosure provided herein in relation to the invention.

The reactor according to the invention provides primarily a response to the problem referred to in point iii) above. Further responses to the needs i) and ii) are provided by the specific embodiments forming the subject of the dependent claims.

In particular, the invention relates to a reactor including:

a first reaction volume, a second reaction volume, wherein:

the first reaction volume is in fluid communication with an inlet port for an oxidizer agent, an inlet port for at least one first reactant and an outlet port for at least one reaction product, said second reaction volume is in fluid communication with an inlet port for at least one second reactant, an outlet port for at least one second reaction product and is furthermore in thermal exchange relationship with said first reaction volume, wherein, during operation, in said first reaction volume an oxidation reaction occurs between said at least one first reactant and said oxidizer agent with the formation of said at least one first reaction product, and in said second reaction volume a gasification reaction occurs of said second reactant with the contribution of a thermal energy flow exchanged between the first and the second reaction volumes with formation of said at least one second reaction product.

Further advantageous aspects of the invention form the subject of one or more of the dependent claims, which form an integral part of the technical teaching provided herein in relation to the invention.

BRIEF DESCRIPTION OF THE DRAWINGS

The invention will now be described with reference to the annexed drawings, wherein:

FIG. 3D is a longitudinal sectional view of the component of FIGS. 3B and 3C;

FIGS. 4G and 4H are, respectively, a plan view and a longitudinal sectional view of a component indicated by the arrow IVG/H of FIG. 4A;

FIGS. 5A, 5B, and 5C each illustrate an exploded view of elements of the reactor according to the invention;

FIGS. 6A, 6B, and 6C illustrate detailed cross-sectional views according to the arrows VI-A, VI-B, and VI-C, respectively, of FIG. 5C;

FIG. 7 illustrates an exploded view of further components of the reactor of FIG. 1;

FIGS. 9, 10, and 11 are schematic views of different configurations of the reactor according to various embodiments of the invention; and FIGS. 9A, 9B, and 9C illustrate aspects of further embodiments of the invention.

DETAILED DESCRIPTION

Figure 1:
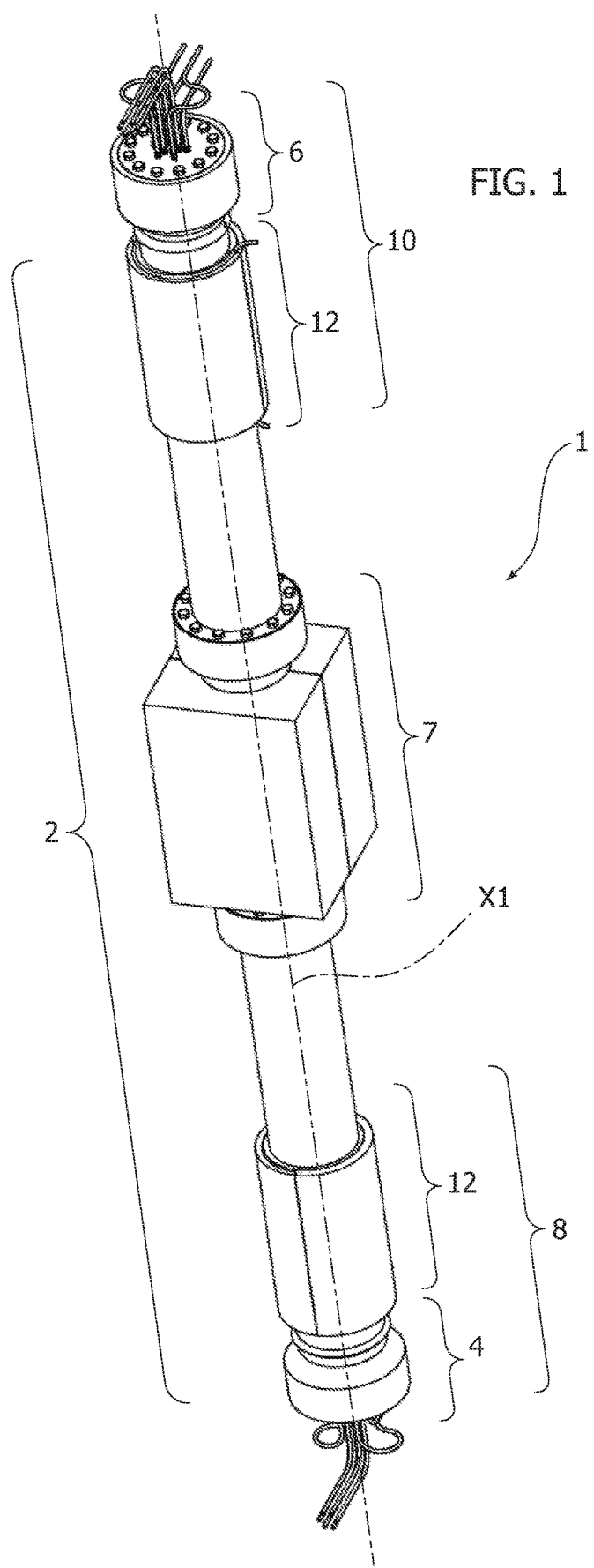
FIG. 1 is a perspective view of a reactor according to various preferred embodiments of the invention.

The reference number 1 in FIG. 1 designates as a whole a reactor according to various preferred embodiments of the invention. The reactor 1 includes a longitudinal axis X1 along which there a tubular shell 2, having a structural function, extends.

The tubular shell 2 is delimited by a first end cap 4 and a second end cap 6 arranged at opposite ends of the shell and includes, in a substantially median position, a reaction core 7. In general, the entire volume inside the shell 2 is a reaction volume, but it is at the core 7 where the reaction proper takes place.

The reactor 1 includes a first head portion 8 located in a region corresponding to the first end cap 4 and a second head portion 10 located in a region corresponding to the second end cap 6, in such a way that the reaction core 7 is comprised between the first head portion 8 and the second head portion 10.

Before describing the reactor 1 the diagram of FIG. 9 must be considered. FIG. 9 is a schematic representation of the reactor of FIG. 1 according to the invention, from which it may be noted how the reactor 1 includes:

a first reaction volume V1; and a second reaction volume V2, wherein:

the first reaction volume V1 is in fluid communication with an inlet port of at least one first reactant R1_IN and an inlet port of an oxidizer agent OX_IN, in particular through an outlet port of the oxidizer agent OX_OUT; and the second reaction volume V2 is in fluid communication with an inlet port of at least one second reactant R2_IN and a discharge port of at least one second reaction product P2_OUT, and is moreover in a relation of heat exchange with the first reaction volume V1.

The reaction volumes V1 and V2 are, according to an advantageous aspect of the invention, arranged concentrically with respect to one another; in particular, the second reaction volume V2 is set around the first reaction volume V1. To obtain this configuration, set within the first reaction volume V1 is a first tubular element T1 closed at one end and having at the opposite end the inlet port OX_IN for the oxidizer agent. In a substantially median area of the tubular element T1 an outlet port OX_OUT for the oxidizer agent is provided preferentially obtained by means of a diffuser with radial holes.

The volume V1 is then delimited by a second tubular element T2 set around the first tubular element T1 so as to define between them the first reaction volume, where there give out into the tubular element T2 the ports R1_IN, P1_OUT, which are made in a first area of the end caps 4, 6, in particular in a central area.

The second reaction volume V2 is defined thanks to a third tubular element T3 set around the second tubular element T2 in such a way that the reaction volume V2 also has a tubular shape and is comprised between the two tubular elements T3 and T2. The reaction volume V2 is in fluid communication with the ports R2_IN and P2_OUT, which are provided on the end caps 4, 6 in a second area, in particular a band or annulus concentric with the aforesaid central area and set around it.

The third tubular element T3 may be alternatively provided by the shell 2 itself, in which case it has a structural function and is resistant both to corrosion and embrittlement in an environment with the presence of hydrogen at high temperatures and to the mechanical action of the pressure inside the reaction volume itself, or else may advantageously be provided as in FIG. 9 by means of a thin-walled tubular element (like the tubular element T2 and the tubular element T1), which has simply the function of resistance to corrosion and high temperatures, both in an oxidizing environment ($O_2$) and in a reducing environment ($H_2$), but not a structural function. The structural strength is hence entirely entrusted to the shell 2 (and to the end caps 4, 6), in particular to a tubular element TC that provides the shell 2 and that has a thick wall.

Defined between the tubular element TC, which is set around the tubular element T3, and the element T3 itself is a further volume V_IN, introduced into which is an inert pressurized fluid which compensates the action of the forces of pressure acting on the tubular element T3, discharging them in turn on the tubular element TC, which is, however, sized to withstand such stresses.

Basically, the volume V_IN defines a sort of pressure-compensation chamber, which makes it possible to provide the tubular elements T1 to T3 as thin-walled tubular elements made of high-strength alloys and to provide, as "massive" element, just the element TC. In this connection, if we designate by D the diameter of the tube and by S its thickness, it is possible to define the following types of tube, namely, thick-walled tube: a tube where the ratio D/S is less than 5 (this can be used with a structural function or a function of resistance to mechanical stresses); and thin-walled tube: a tube where the ratio D/S is greater than 5 (generally not used with a structural function or a function of resistance to significant mechanical stresses).

This having been said, with reference to FIGS. 3 and 3A-3F, the first end cap 4 includes a first bushing 14 and a second bushing 16 arranged coaxial with respect to one another about the axis X1, and coupled in an axial direction to one another. In particular, the first bushing 14 includes a flange 18, provided on which is a ring of axial holes H18, which all have an axis parallel to the axis X1 and are equally spaced apart from one another. The centres of the holes H18 lie on a circumference with centre on the axis X1.

The holes H18 are configured for receiving fixing screws SC18 that provide a connection of the flange 18 to the shell 2 (connecting, as a result, the end cap 4 to the shell 2 itself).

The first bushing 14 moreover includes a collar 20 having circular rings of holes that are concentric to one another about the axis X1.

In particular, the centres of the holes in question are arranged along circumferences that are concentric with respect to one another about the axis X1, and are all spaced at equal angular distances apart along the circumferences in such a way that the holes will themselves also be spaced at equal angular distances apart. In the embodiment illustrated herein, with reference for example to FIGS. 3B and 3C, the holes of both of the rings have an arrangement corresponding to the vertices of a regular hexagon and are identified by the references 22 for the outermost ring with larger diameter, and 24 for the innermost ring with smaller diameter. By virtue of their arrangement, the holes are aligned in radial directions. Furthermore, the ring of holes 24 is set in the aforementioned central area of the end cap 4, whereas the ring of holes 22 is set in the aforementioned band or annulus concentric to the aforesaid central area and set around it.

Figure 3:
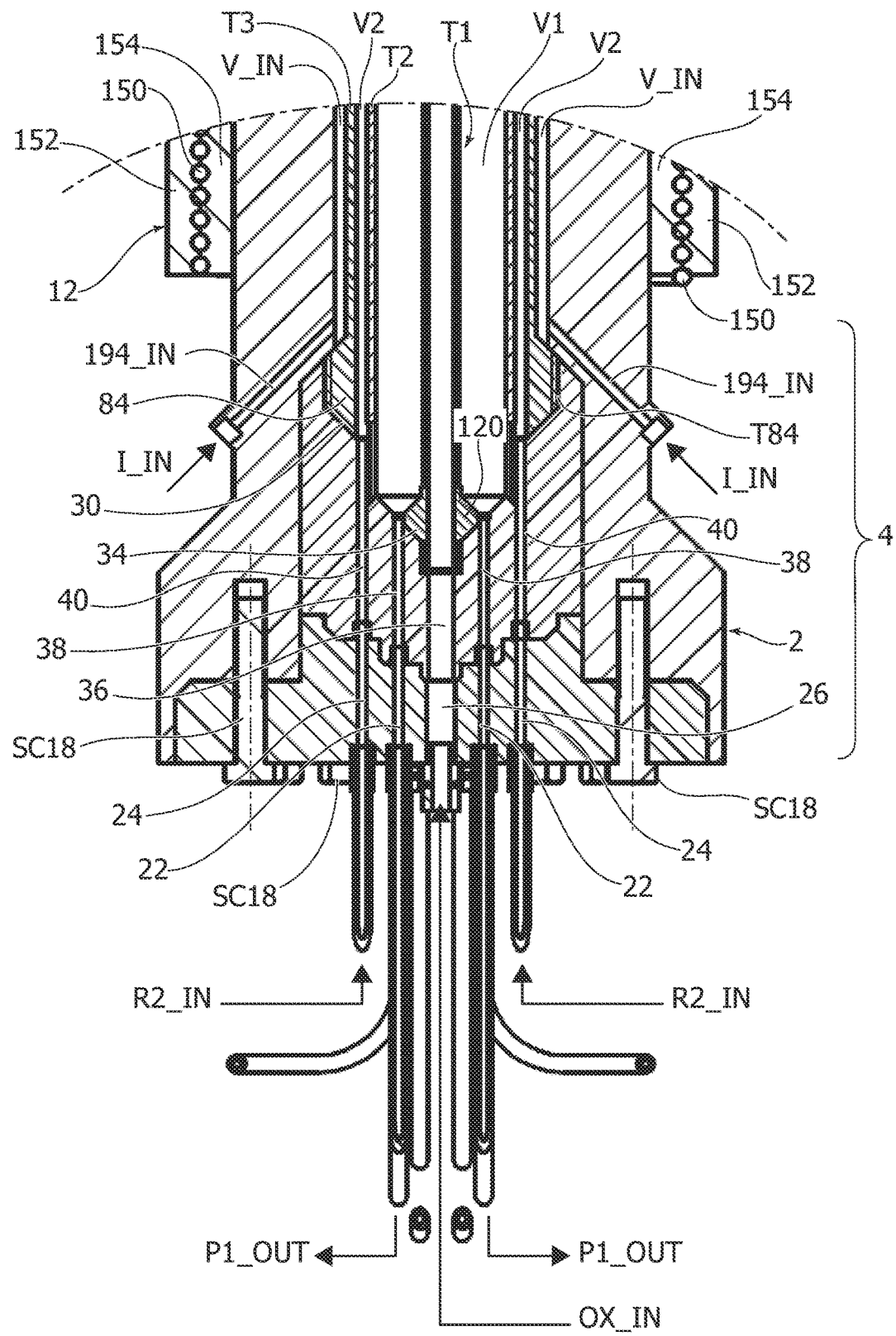
FIG. 3 is a detailed view corresponding to the arrow III of FIG. 2.
Figure 3A:
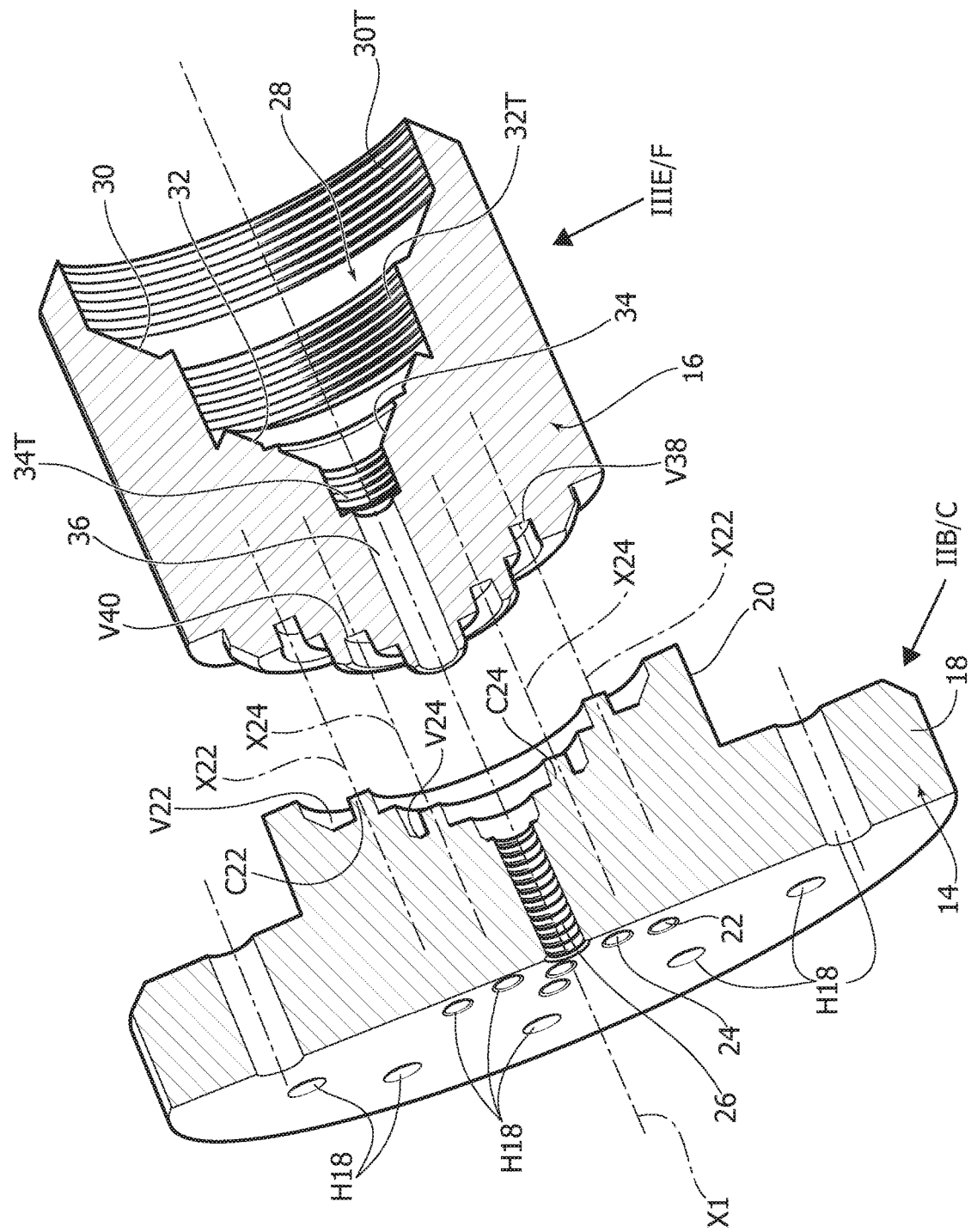
FIG. 3A is an exploded view of a pair of components visible in FIG. 3.
Figure 3B:
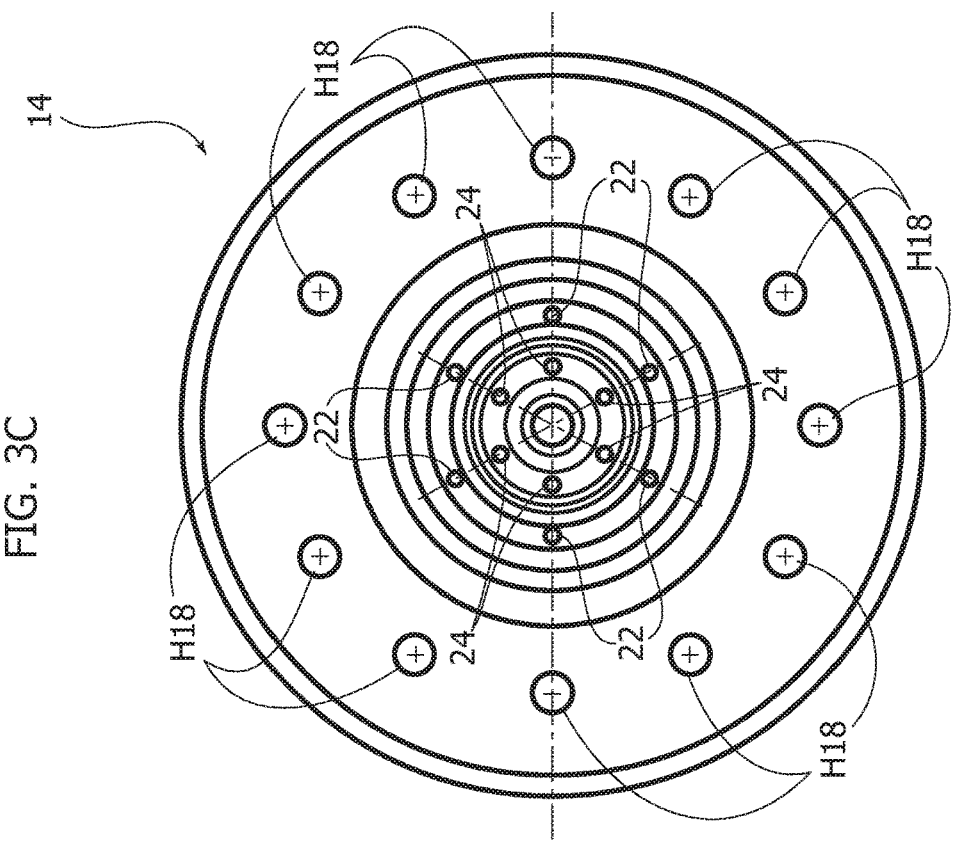
FIGS. 3B and 3C are, respectively, two plan views from opposite ends of a component indicated by the arrow IIIB/C in FIG. 3A.
Figure 3C:
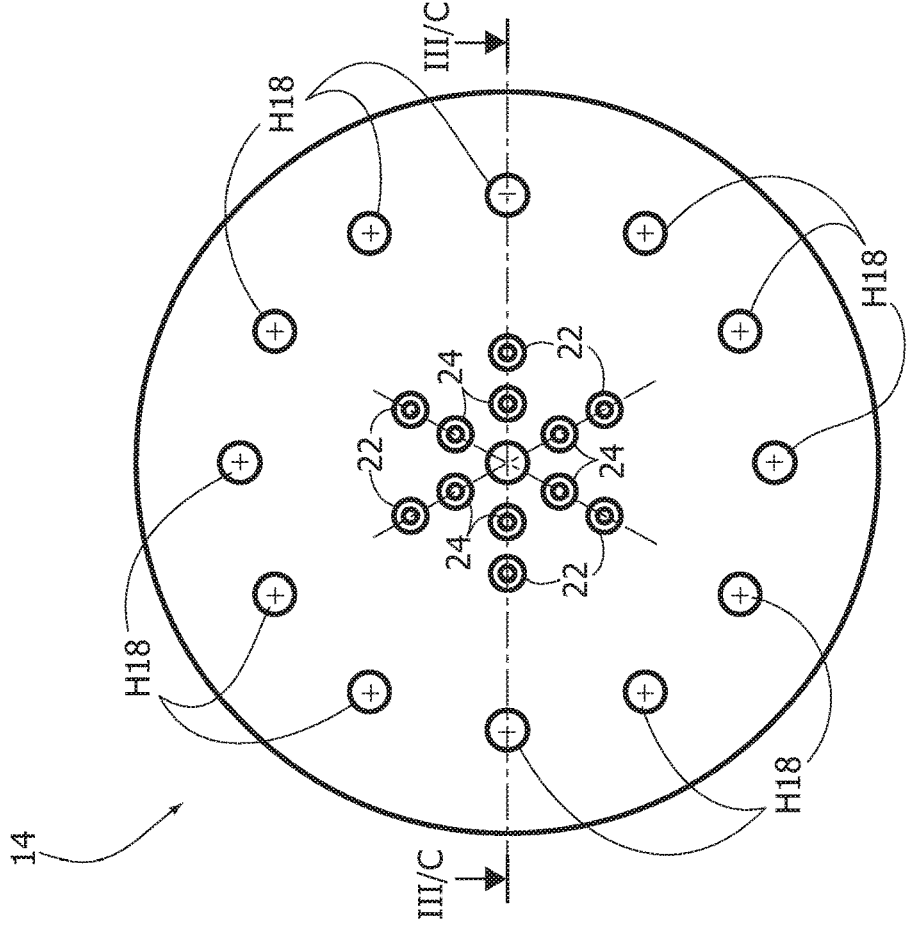
Figure 3F:
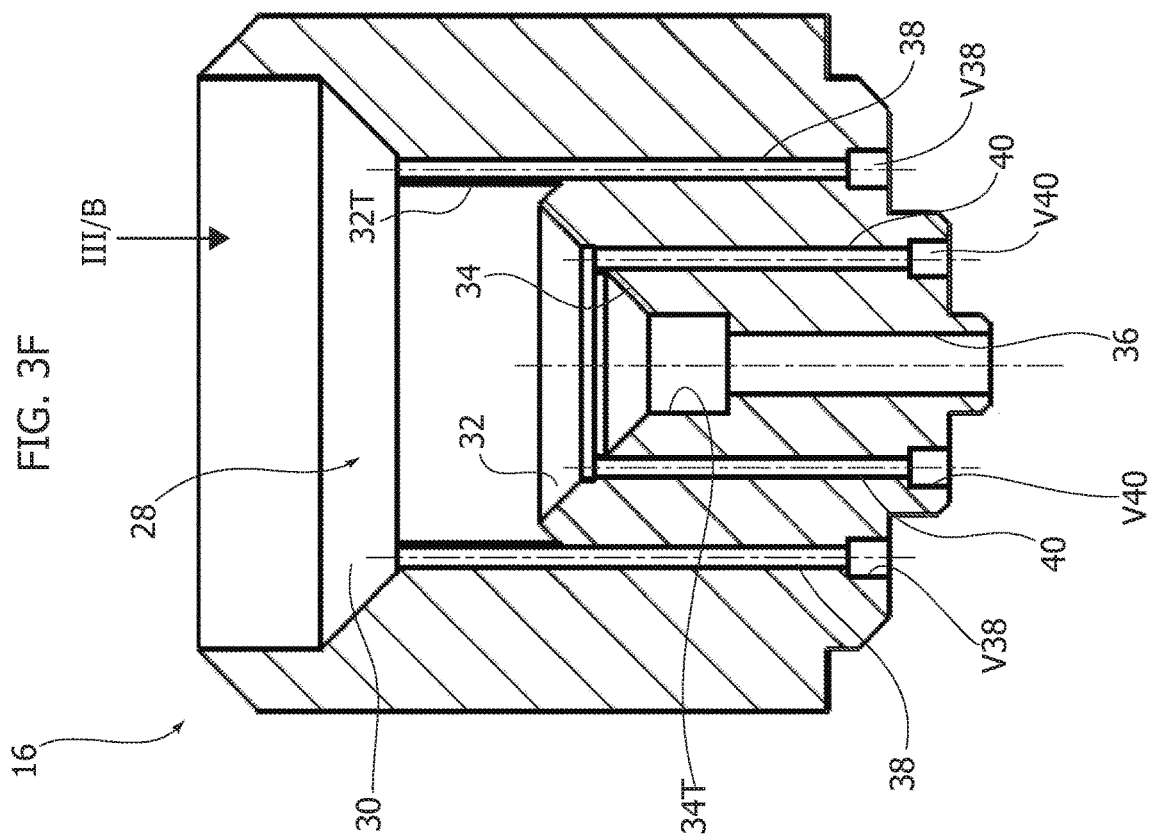
FIGS. 3E and 3F are, respectively, a plan view and a longitudinal sectional view of a component indicated by the arrow IIIE/F of FIG. 3A.
Figure 3E:
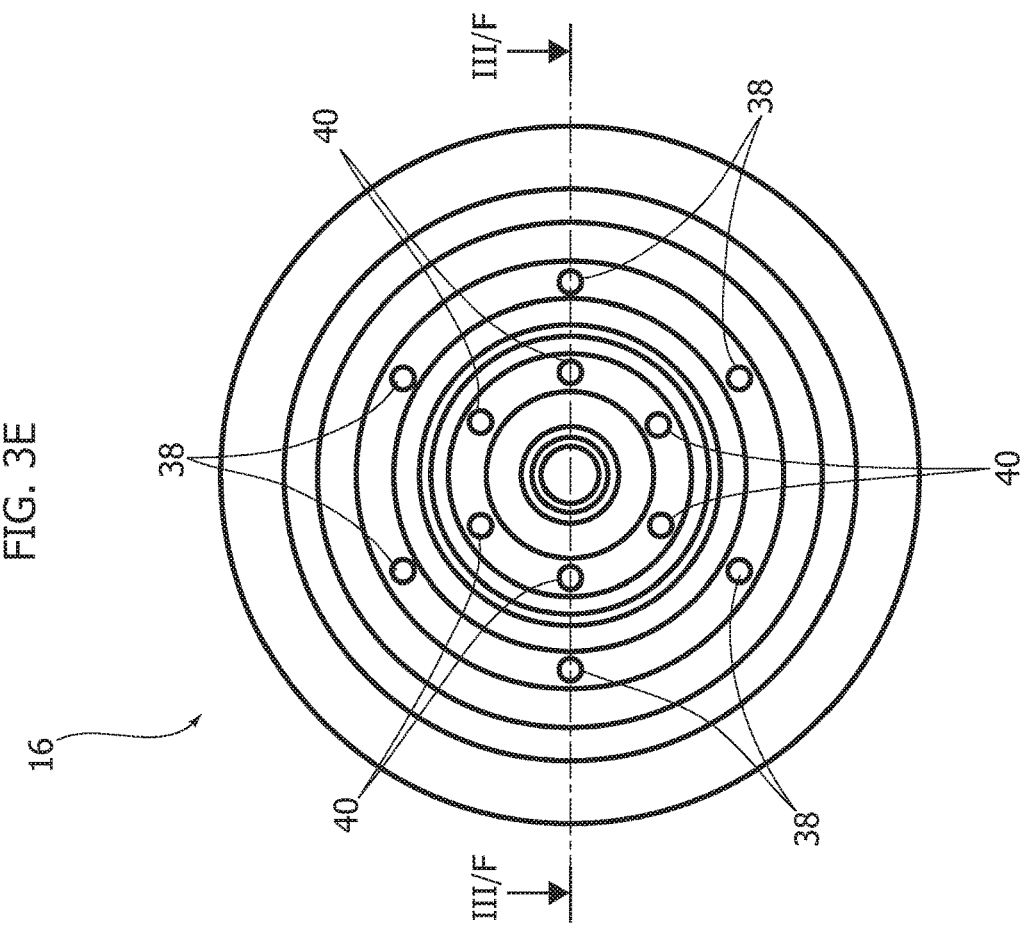

With reference to FIG. 3A, the holes 22, 24—which are all through holes (FIG. 3D)—include axes X22, X24 all parallel to one another and parallel to the axis X1. Furthermore, the holes 22 are provided in a position corresponding to a first internal collar C22, which is separated from the collar 20 by an annular groove V22, whereas the holes 24 are provided in a second internal collar C24, which is separated from the collar C22 by a groove V24. The collar C24 is moreover axially recessed with respect to the collar C22.

The fact of providing rings of holes on collars separated by grooves, which have a different height (i.e., a different position along the axis X1) constitutes a measure for facilitating isolation between the environments onto which the rings of holes give out, which are characterized—as will be described hereinafter—by different conditions in terms of pressure, temperature, and chemical species. The reason for this is that the geometry with grooves and collars enables easier installation of gaskets or the like to guarantee sealing between the various environments.

Finally, the first bushing 14 is completed by a central through hole 26, preferentially threaded, which is coaxial to the axis X1 and is configured for receiving a connector that provides the inlet port OX_IN.

As regards the second bushing 16 (FIGS. 3E-3F), it has a substantially cylindrical shape and is provided with a tri-conical through cavity 28 sharing the axis X1. The tri-conical through cavity includes a first shoulder 30, a second shoulder 32, and a third shoulder 34, all having a conical geometry and all adjacent to a threaded stretch, wherein:

a threaded stretch 30T precedes the shoulder 30;
a threaded stretch 32T precedes the shoulder 32, and
a threaded stretch 34T follows the shoulder 34.

Located adjacent to the threaded stretch 34T is moreover a central through hole 36 sharing the axis X1 and configured for constituting the prosecution of the hole 26 on the bushing 14. Moreover provided on the bushing 16 are a further two rings of holes 38, 40, where the centres of the holes 38 on the first are arranged equally spaced apart along a circumference of diameter larger than that of circumference on which the holes 40 are arranged, once again equally spaced apart.

Both of the circumferences are coaxial to the axis X1, and in this embodiment the holes 38 and 40 are arranged in the vertices of a regular hexagon in the same positions, respectively, as the holes 22 and 24 on the bushing 14. In particular, all the holes 38 are coaxial to the corresponding axes X22 and holes 22, and all the holes 40 are coaxial to the corresponding axes X24 and holes 24.

The holes 38 and 40 are through holes with respect to the bushing 16: the first holes 38 give out at the feet of the first conical shoulder 30, whereas the second holes 40 give out at the feet of the conical shoulder 32.

Since the holes 38 and 40 have to couple to the holes 22 and 24, they are made at grooves V38, V40 configured for receiving the internal collars C22, C24, respectively.

Figure 4:
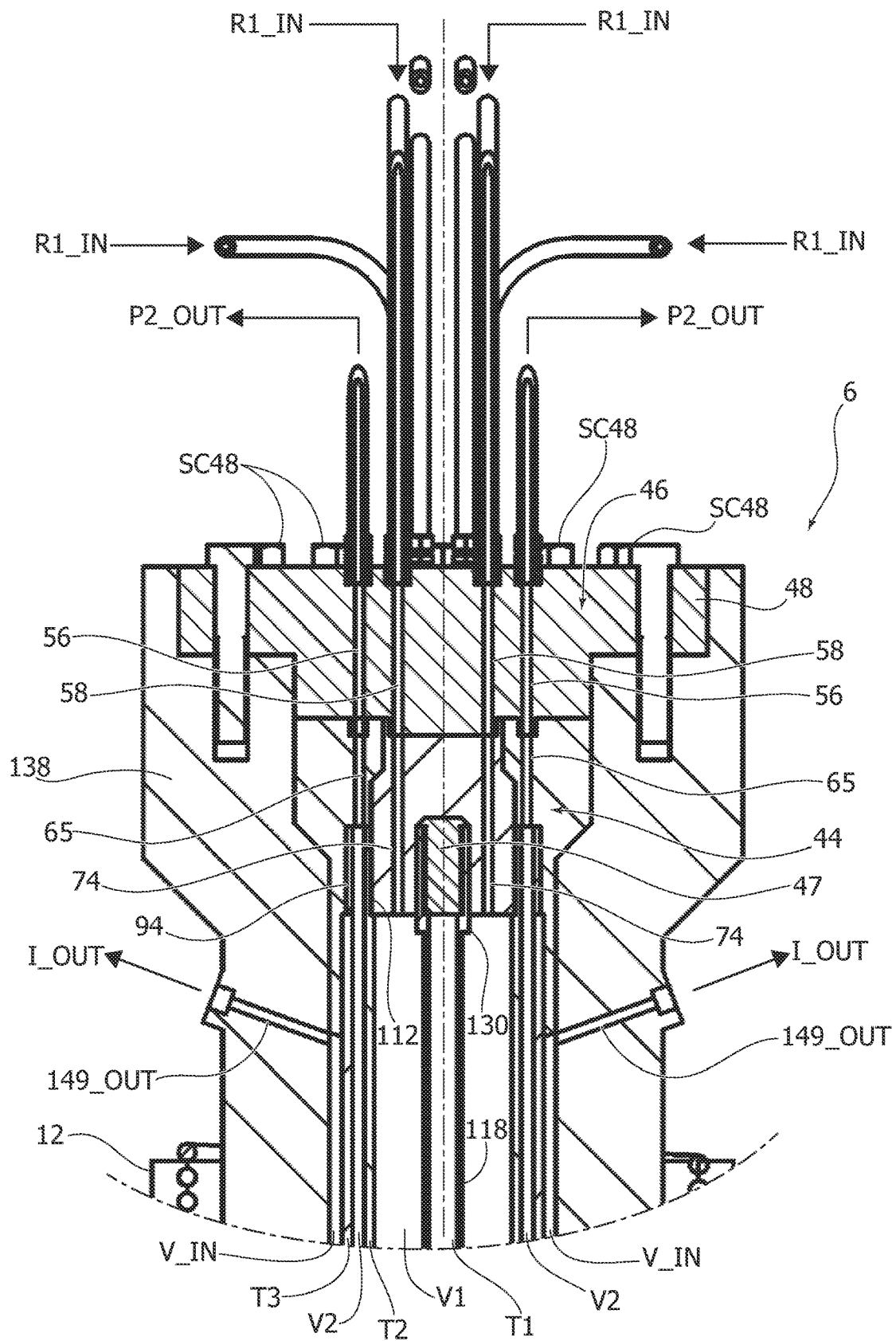
FIG. 4 is a cross-sectional view similar to that of FIG. 3 but corresponding to a cross section indicated by the arrow IV in FIG. 2.

With reference to FIG. 4 and to FIGS. 4A-4H the second end cap 6 will now be described.

The second end cap 6 includes a third bushing 42, a fourth bushing 44, a fifth bushing 46, and a centering pin 47. All the aforesaid components are arranged coupled to each another according to the modalities that will be described and are coaxial to the axis X1.

The bushing 42 (FIGS. 4A, 4B, and 4C) includes a flange 48 and a collar 50. The flange 48 includes a ring of axial through holes spaced at equal angular distances apart and designated by the references H48, which have their axis parallel to the axis X1. The holes H48 are configured for receiving fixing screws SC48 by means of which the end cap 6 is fixed to the shell 2.

Figure 4A:
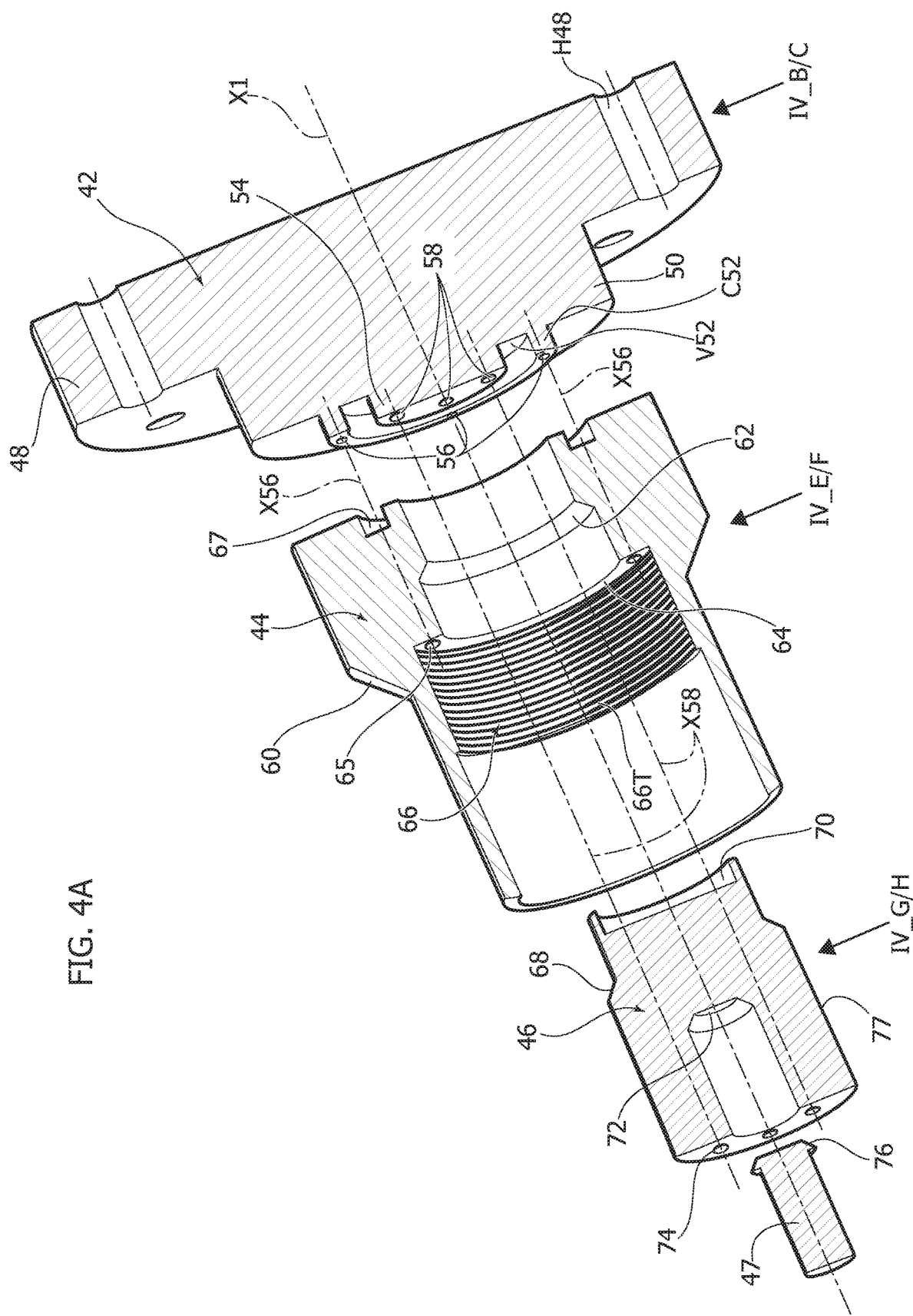
FIG. 4A is an exploded perspective view of components visible in the cross section of FIG. 4.
Figure 4C:
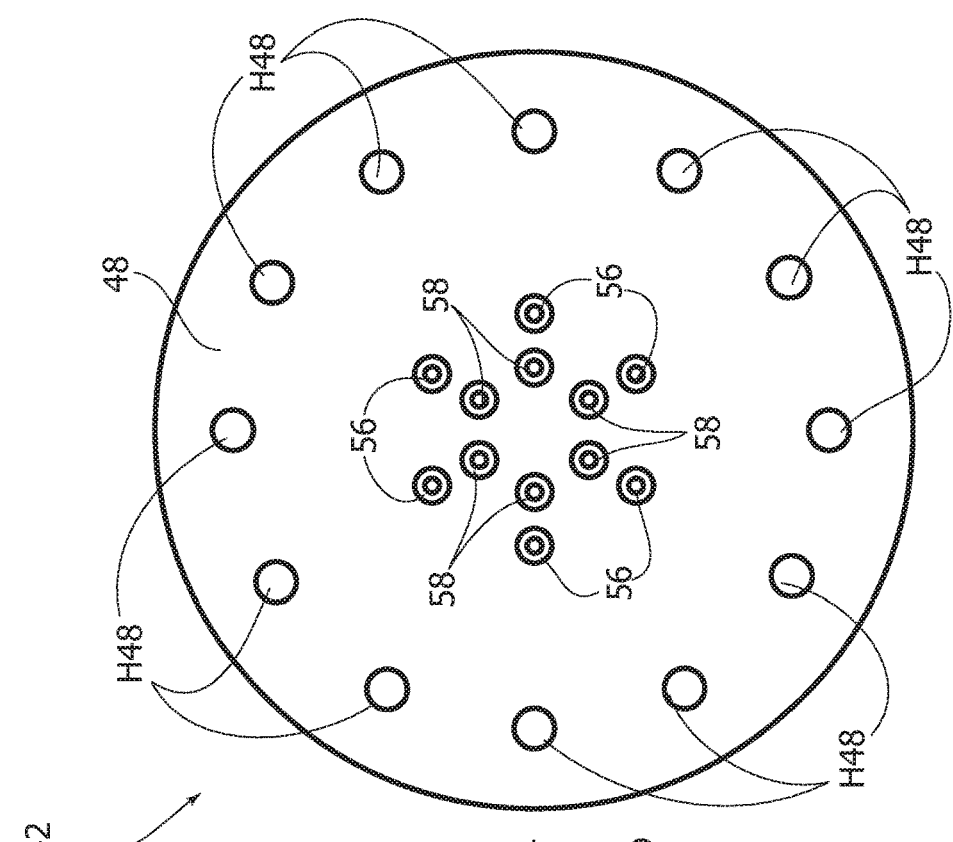
FIGS. 4B and 4C are plan views from opposite sides of the component indicated by the arrow IVB/C in FIG. 4A.
Figure 4B:
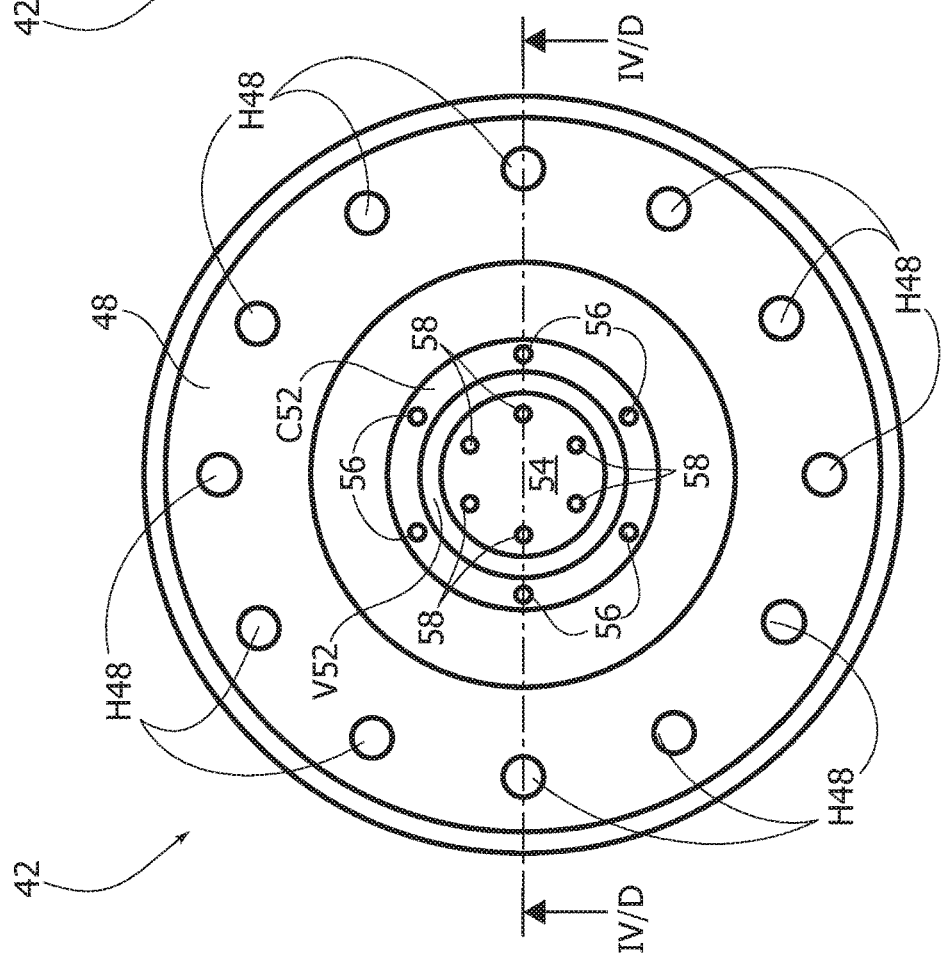
Figure 4D:
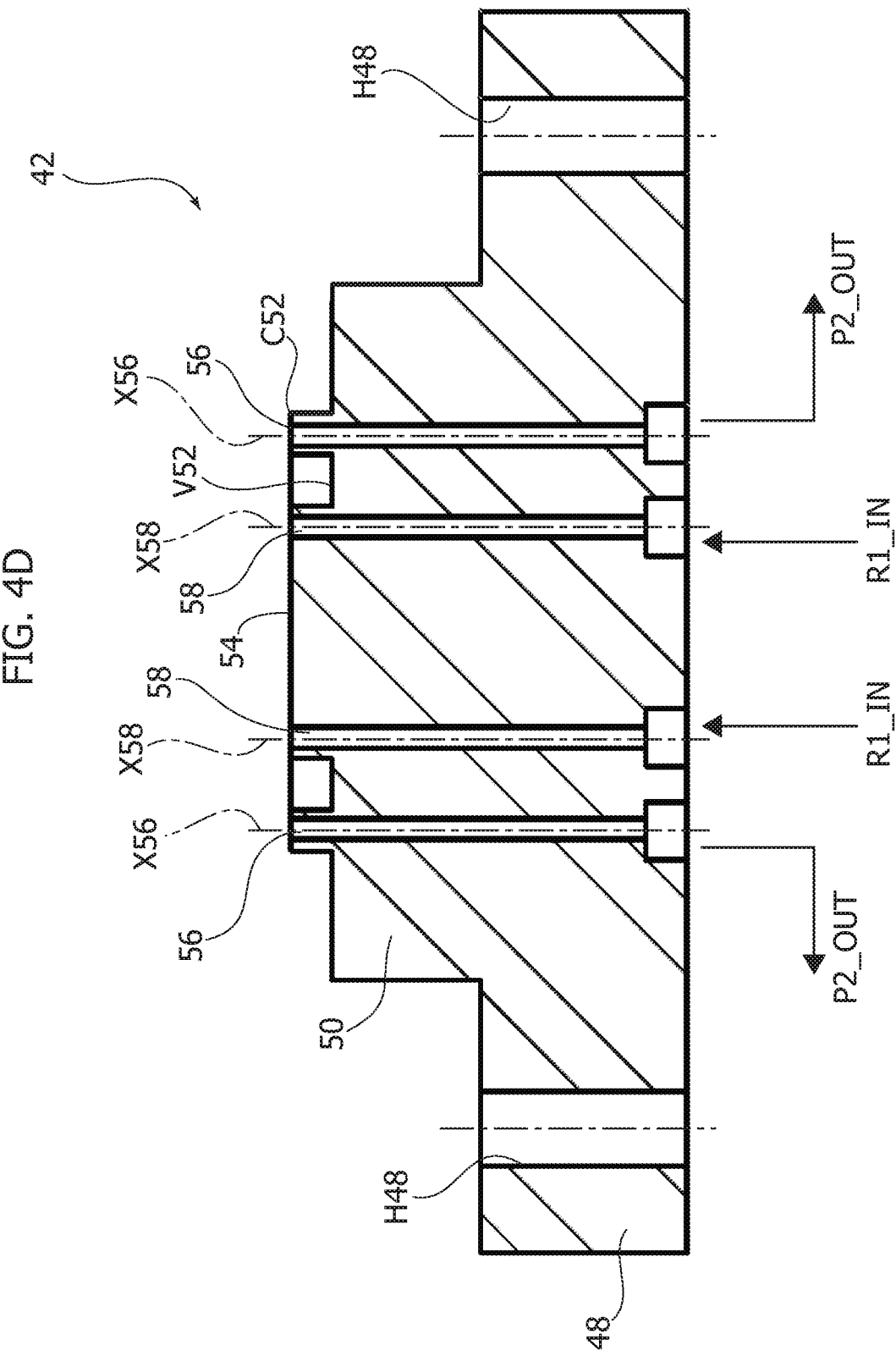
FIG. 4D is a longitudinal sectional view of the component of FIGS. 4B and 4C.
Figure 4F:
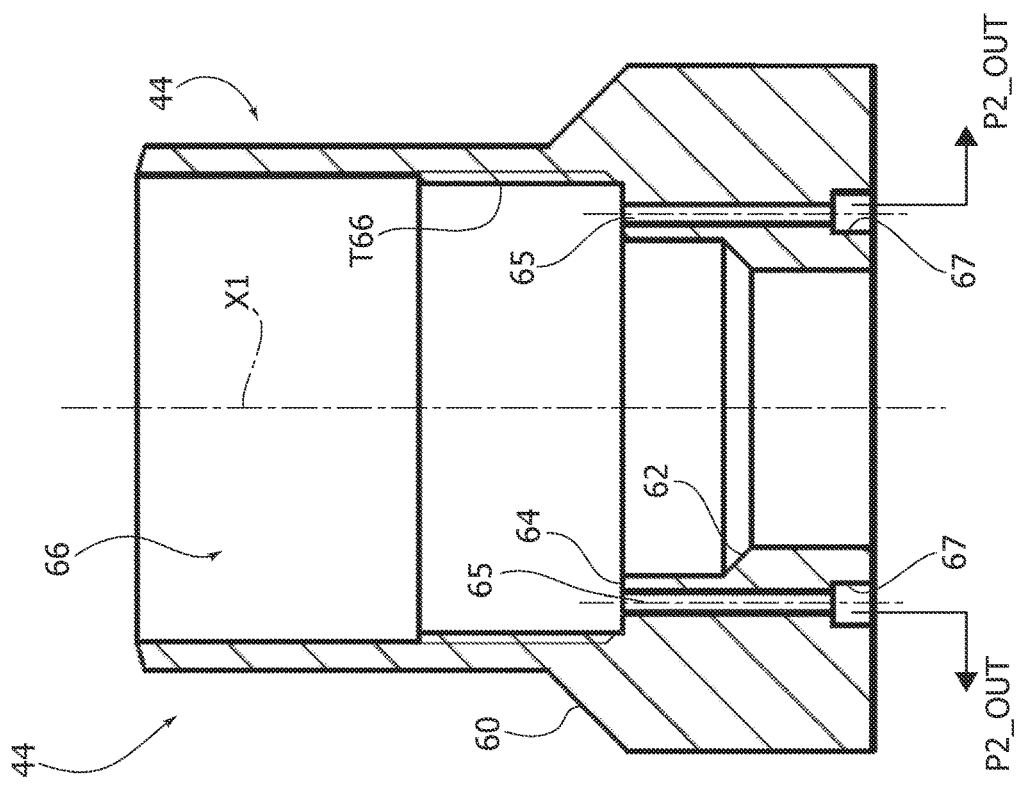
FIGS. 4E and 4F are, respectively, a plan view and a longitudinal sectional view of a component indicated by the arrow IVE/F in FIG. 4A.
Figure 4E:
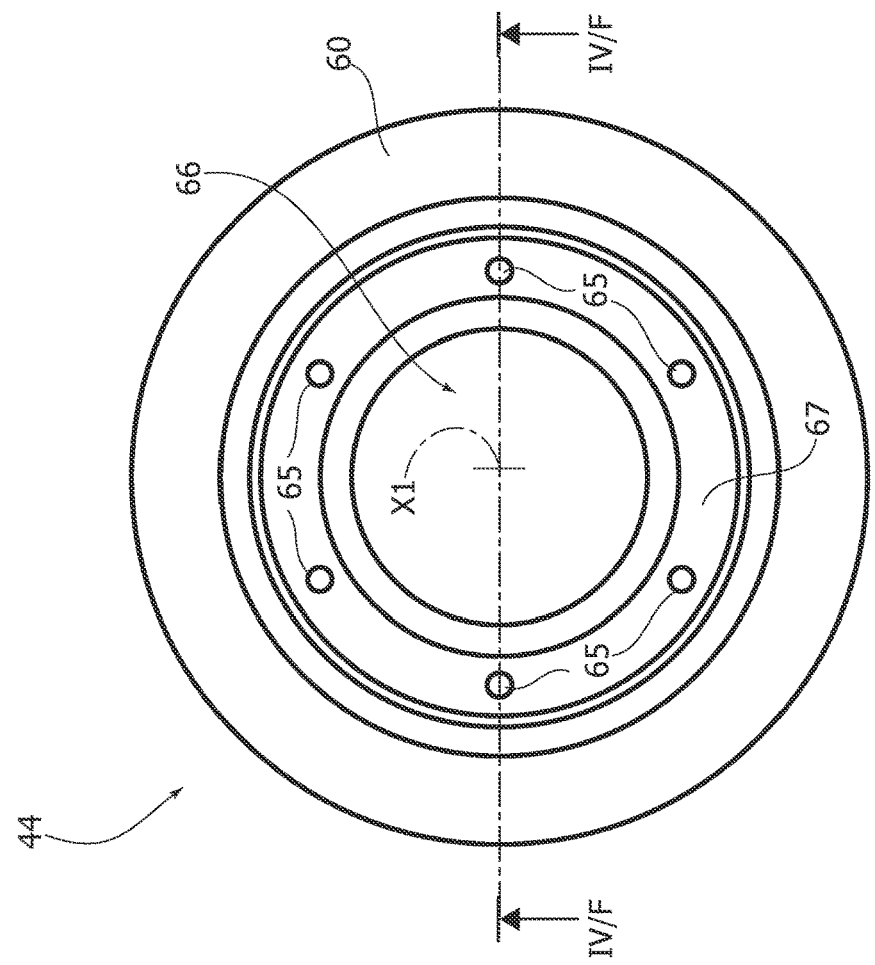

In the collar 50, with reference to FIGS. 4A, 4B, 4C, two rings of holes are provided arranged along concentric circumferences and having different diameters. In particular, the collar 50 includes an internal collar C52 in relief with respect to the collar 50 itself and a central circular projection 54, which is spaced apart from the collar C52 by means of an annular groove V52, where all the components are coaxial to the axis X1. Provided in the collar C52 is the first of the two rings of holes, which have the reference number 56 and are arranged along a first circumference with the centres spaced at equal angular distances apart and are located at the vertices of a regular hexagon. The axes of the holes 56 are designated by the reference X56.

In the central relief 54 there is instead provided a second set of holes 58, which also have centres arranged spaced at equal angular distances apart on a circumference sharing the axis X1 at the vertices of a regular hexagon and where the circumference on which the holes 58 lie has a diameter smaller than that of the circumference on which the holes 56 lie. The holes 56 and 58, in addition to being spaced at equal angular distances apart, are through holes (FIG. 4D) and are moreover radially aligned, as may be seen from the plan views of FIG. 4B and FIG. 4C.

The holes 56 provide the outlet ports for the at least one second reaction product P2_OUT, as may be seen in FIG. 4. The holes 58 provide, instead, the inlet ports for at least one first reactant designated by the reference R1_IN.

The fourth bushing 44 (FIGS. 4E and 4F) includes an external conical shoulder 60, an internal conical shoulder 62 having a diameter smaller than the shoulder 60, and an annular shoulder 64 set (internally) substantially in a position corresponding to the conical shoulder 60. The shoulder 64 gives out onto a cylindrical through cavity 66, provided on which is an internal thread 66T adjacent to the shoulder 64. The cavity 66 traverses the entire axial extension of the bushing 44 and giving out onto the cavity is the central relief 54, and moreover forming part thereof is the shoulder 62.

An annular groove 67 is set at one end of the bushing 44 facing the bushing 42, and is in particular an annular groove configured for providing a shape fit with the collar C52.

Like the end cap 4, the provision of sequences of grooves and collars in relief where holes are provided corresponding to the working ports of the reactor 1 enables isolation, as far as possible, of the different environments to which the ports are connected, in so far as it, of course, favours provision of sealing gaskets.

In this connection, provided within the annular groove 67 are axial through holes 65 that give out into the groove 67 and into the cavity 66 and are arranged on a circumference having the same diameter as the circumference on which the centres of the holes 56 lie, in such a way that—given that the holes 65 are arranged coaxial to the holes 56—there can be created a continuity between them upon coupling with the bushing 42 (for this reason, the holes 65 and 56 also have the same diameter).

The fifth bushing 46 has a substantially cylindrical shape and includes a conical shoulder 68 configured for bearing upon the conical shoulder 62 and a collar 70 configured for receiving the collar 54 and establishing a shape fit therewith, and moreover includes a plurality of axial through holes 74, the centres of which are arranged spaced at equal angular distances apart along a circumference of identical diameter as the circumference on which the centres of the holes 58 lie.

In this way, since the holes 74 are coaxial to the axes X58 (and since they have the same diameter as the holes 58), a continuity is provided between them and the holes 58 themselves so as to provide a single passageway. The bushing 46 is completed by an external thread 77, which extends from the conical shoulder 68 to the end of the bushing 46 opposite to the one in which the collar 70 is located.

The holes 74 give out on the collar 70 and at the opposite end of the bushing 46, around the cavity that houses the shoulder 72.

Finally, the centering pin 47 has a conical head 76, which is configured to bear upon the shoulder 72 when the end cap 6 is installed on the shell 2.

With reference to FIGS. 5A-5C, the tubular elements T1, T2, T3 will now be described in a preferred embodiment of the invention.

With reference to FIG. 5A, the tubular element T3 includes a first portion 78, a second portion 80, and a third portion 82, in turn all provided as thin-walled tubular elements. The portion 78 is configured for coupling with the first end cap 4, the portion 80 is configured for being set in a position corresponding to the reaction core 7, whereas the third portion 82 is configured for coupling with the end cap 6.

The first portion 78 includes a conical head 84 with an external thread T84 and a threaded collar 86. The second portion 80 includes an end with internal thread 88 and an end with threaded collar 90, opposite to the end 88. Finally, the portion 82 includes a first end with internal thread 92 and a second end with external thread 94.

As may be seen from the schematic representation of FIG. 5A, the end 92 is screwed on the collar 90, and the end 88 is screwed on the collar 86.

With reference to FIG. 5B, the second tubular element T2 is also made up of three portions, all provided in turn as thin-walled tubular elements. The three portions include a first portion 96, a second portion 98, and a third portion 100.

The first portion 96 is configured for coupling to the first end cap 4, the portion 100 is configured for coupling to the second end cap 6, whereas the portion 98 is configured for being accommodated in an intermediate position between the portions 96 and 100 and at the reaction core 7. For this purpose, the portion 96 includes an end with external thread 102 configured for coupling with the end cap 4, and a second end with internal thread 104.

The portion 98 includes a first end with external thread 106 and a second end with internal thread 108. The third portion 100 includes a first end with external thread 110 and a second end with internal thread 112. The end 110 is coupled to the end 108, whereas the end 106 is coupled to the end 104 so as to define a single tubular element T2, whereas the ends 102 and 112 are coupled to the respective end caps 4, 6.

Finally, with reference to FIG. 5C, the tubular element T1 is made up of three portions of thin-walled tubular element including a first portion 114, a second portion 116, and a third portion 118. The portions in question are coupled to one another by means of threaded connections to define a single tubular element. Note, however, that unlike the tubular element T2, the element T1, like the element T3 is blind at the end that is coupled to the first end cap 3; in particular, a conical head 120 is provided that has a conical shoulder 121 and is blind at the end that is coupled to the end cap 4 itself. At the opposite end of the element 114, a collar 122 is provided with internal thread. The portion 116 includes an end with external thread 124, a perforated cylindrical wall 125 that provides an outlet port for the oxidizer agent OX_OUT, and a second end where a collar with internal thread 126 is provided.

Finally, the portion 118 includes a first end with external thread 128, and a second end with a collar with internal thread 130. The ends 128 and 126 and 124 and 122 are coupled to one another to define a single tubular element, whereas the ends 120 and the ends 130 are respectively coupled to the end caps 4 and 6.

With reference to FIG. 6, there may be appreciated in greater detail the conical head 120 of the element 114 (FIG. 6A), the collar 122, as also the collars 126 and 130 (FIG. 6B), and the perforated wall 125 with holes H_OX that provide the port OX_OUT.

With reference to FIG. 7, the tubular element TC that provides the shell 2 will now be described. Like the tubular elements T1 to T3, the tubular element TC is preferably obtained by the union of three (or more in some embodiments) distinct portions. However, the tubular element TC that provides the shell 2 is thick-walled, and includes a first portion 132, a second portion 134, and a third portion 136 all provided as thick-walled tubular elements.

The first portion 132 includes a first cup-shaped end 138 including a ring of axial holes within which the screws SC 42 engage. The portion 132 moreover includes a flange 140 at the opposite end, which is also provided with a ring of axial through holes.

The portion 134, which is configured for being located at the reaction core 7, includes a cup-shaped end 142, which is also provided with a ring of axial holes having the same arrangement and size, and being in the same number as the holes on the flange 140, in such a way that fixing screws that pass through holes in the flange 140 and in the cup-shaped end 142 fix the element 132 to the element 134.

At the opposite end, the portion 134 includes a flange identical to the flange 140, which is also provided with a ring of axial through holes.

Finally, the portion 136 includes a cup-shaped end 146 provided with a ring of radial holes that are in the same number and have the same position and size as the holes on the flange 144, where fixing screws pass through the holes in the flange 144 and engage the holes of the cup-shaped end 146 for fixing the portion 134 to the portion 136.

At the opposite end, the portion 136 includes a second cup-shaped end 148, which has a structure similar to that of the end 138 and is provided with a ring of axial holes within which the screws SC42 engage.

Both the first portion 132 and the third portion 136 include, one in the immediate vicinity of the cup-shaped end 138 and the other in the immediate vicinity of the cup-shaped end 148, pairs of holes 149OUT and 149IN respectively, which have an axis incident on the axis X1 and provide inlet ports (149IN) and discharge ports (149OUT) for an inert fluid that is introduced into the volume V3 described previously.

Finally, with reference to FIGS. 8A and 8B, each heat-conditioning unit 12 will now be described in detail.

The heat-conditioning unit 12 includes a cylindrical coil 150, which is enveloped by two pairs of half-jackets. The coil 150 functions as channel of flow for a thermovector fluid. This coil is used for conditioning the temperature profile of the reactor. In particular, in the starting stage it is used as heating element in order to bring the values of temperature to those proper to operation in steady-state conditions, whereas whilst in steady-state conditions it serves to cool the heads of the reactor.

In particular, each pair includes an outer half-jacket 152 and an inner half-jacket 154, both provided with a corrugated surface configured for shape fit with the turns that make up the coil 150.

Figure 8B:
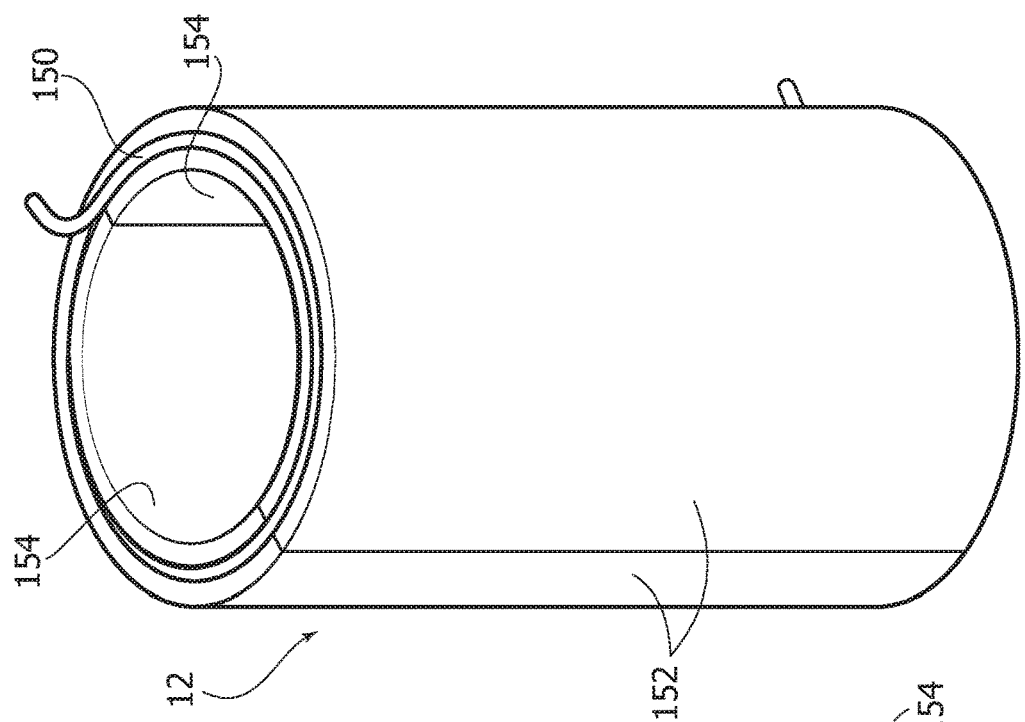
FIGS. 8A and 8B illustrate, respectively, an exploded view and an assembled view of a heat-conditioning unit of the reactor of FIG. 1.
Figure 8A:
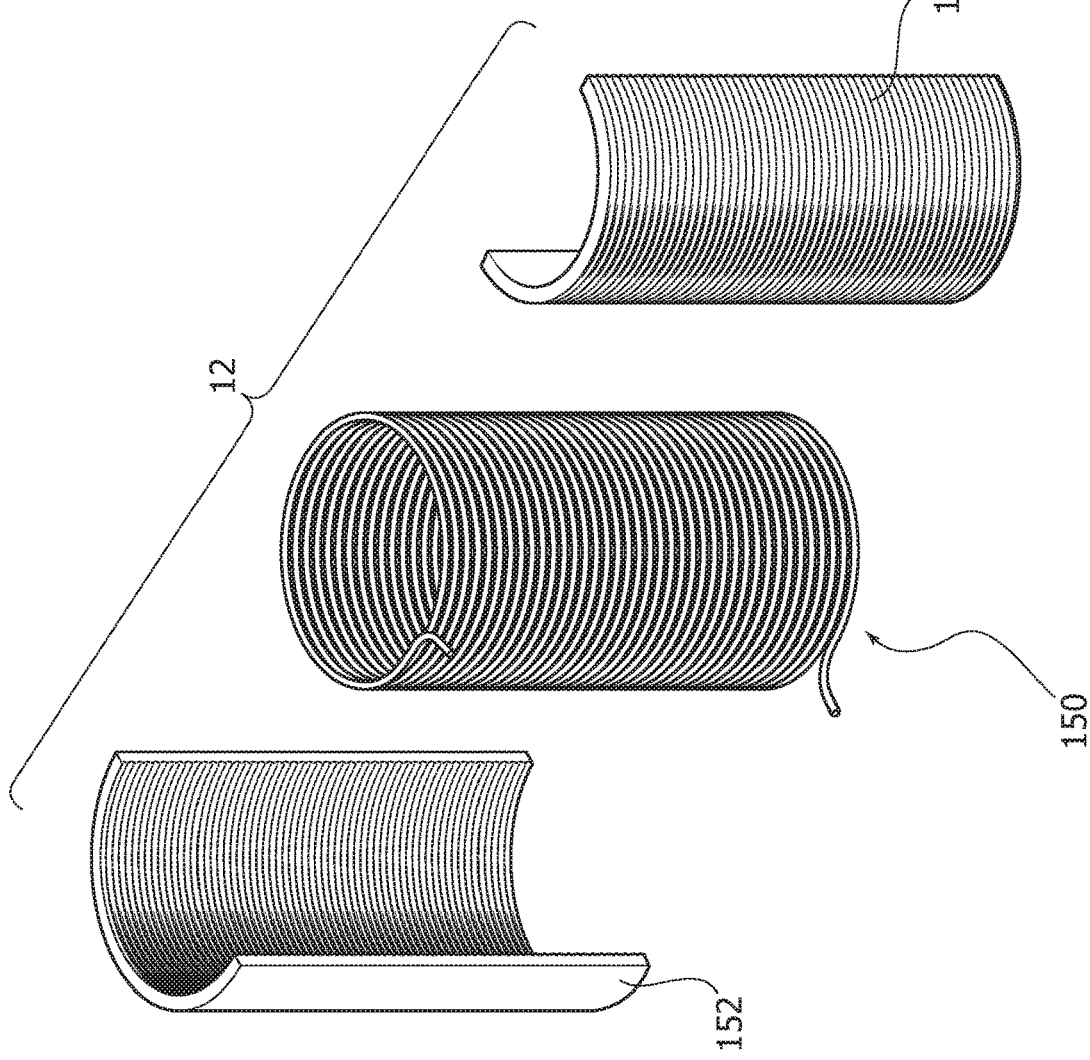

As may be seen in FIG. 8B, the jacket that envelops the coil 150 is made up of two cylinders obtained via the union of two half-jackets 154 and two half-jackets 152. Preferentially, the half-jackets 154 are made of material with high thermal conductivity, for example copper, whereas the half-jackets 152 are made of thermally insulating material, to confine heat exchanges to just the interface between the coil 150 and the head portion of the reactor 1.

With the aid of all the figures described previously, assembly of the reactor 1 and consequent definition of the various volumes of treatment of the reactants will now be briefly illustrated.

With reference to FIG. 5, the tubular elements T1, T2 and T3 are arranged one inside the other in sequence (T1 inside T2, and T2 inside T3) according to the scheme of installation identified by the axis X1 that extends, represented as a broken line, through FIGS. 5A, 5B, and 5C. The various portions of each tubular element T1, T2, T3 are assembled together in the way described previously, so that the tubular element T1 is inserted axially in the tubular element T2, and the ensemble of these two elements is axially inserted into the tubular element T3.

In the assembled configuration, with reference also to FIGS. 3 and 4, the conical head 120 occupies a position corresponding to the conical head 84, and the end with external thread 102 is also in a position corresponding to the heads 84 and 120. Located, instead, at the opposite end are the ends 92, 112 and 130. The ensemble of the heads 84 and 120 and of the end 102 occupies in particular a position corresponding to the first end cap 4, whereas the remaining ensemble of the ends 92, 112 and 130 occupies a position corresponding to the second end cap 6.

The second end cap 6 is assembled by coupling along the axis X1 the components displayed in exploded view in FIG. 4A, in particular achieving coupling between the collar C52 and the annular groove 67, the collar 70, the cavity 66, and the central projection 54, the shoulder 68 and the shoulder 62, and finally the conical head 76 and the shoulder 72.

This condition may be seen in FIG. 4. The end cap thus assembled is fitted on the end 138, and the screws SC48 fix the flange 48 to the end 138 itself. The end 130 is then screwed on the pin 47, the outer surface of which is threaded, the end 112 is screwed on the external thread 77, whereas the end 94 is screwed in the internal thread 66T.

It should moreover be noted, with reference to FIG. 4, that the holes 149OUT give out onto the outer wall of the tubular element T3, which defines with the inner wall of the tubular element TC the volume V_IN. The inner wall of the tubular element T3 is set facing the outer wall of the tubular element T2 to define the volume V2, whereas the inner wall of the tubular element T2 is set facing the tubular element T1 to define the volume V1. The end of the tubular element T1 located in a position corresponding to the end cap 6 is moreover rendered blind thanks to the pin 47, unlike all the other ends, which communicate with the ports P2_OUT (volume V2) and R1_IN (volume V1).

At the opposite end, the first end cap 4 is assembled by coupling along the axis X1 the components displayed in exploded view in FIG. 3A, in particular bringing the grooves V38, V40 to mate with the reliefs C22 and C24 and the holes 22, 24 and 38, 40 (the holes are visible in the subsequent FIGS. 3B-3F).

The conical head 120 finds accommodation on the shoulder 34 in such a way that the tubular element T1 is in fluid communication with the sequence formed by the holes 36 and 26 and the port OX_IN. The end 102 of the tubular element T2 is, instead, screwed in the thread 32T, whereas the conical head 84 finds accommodation against the shoulder 30 and is screwed in the thread 30T by means of the corresponding thread T84.

The screws SC18 then pack tight the end cap 4 against the shell 2, in particular against the end 148. Note that the simultaneous provision of the conical head 120 and of the conical head 76 at the opposite end of the tubular element T1 enables axial centering and preloading of the tubular element T1 itself.

Furthermore, provision of the conical shoulders helps both centering and axial preloading of the ensemble of elements. At the end cap 3, all the volumes and all the tubular elements are in communication with the external environment. In particular, the volume V3 is in communication with the external environment via the holes 149_IN that supply the ports I_IN; the volume V2 is in communication with the external environment thanks to the sequence of holes 40 and 24 that gives out into the volume V2 and supplies in sequence the port R2_IN; finally, the volume V1 is in fluid communication with the external environment thanks to the sequence of holes 38 and 22 that is in fluid communication with the port P1_OUT. The volume inside the tubular element T1 is instead in communication with the port OX_IN.

Basically, following upon assembly a reactor 1 is obtained, the shell 2 of which is delimited axially by the first end cap 4 and the second end cap 6, located at opposite ends thereof, and wherein:

the first end cap 4 includes the inlet port of the aforesaid oxidizer agent OX_IN in a position substantially sharing the longitudinal axis X1 of the shell 2, a first plurality of passage channels 24, 40 (coaxial in pairs and in fluid communication with one another) arranged in a ring around the inlet port of the oxidizer agent OX_IN, and defining the inlet port of said at least one second reactant R2_IN, and a second plurality of passage channels 22, 38 (coaxial in pairs and in fluid communication with one another) arranged in a ring around the first plurality of passage channels 24, 40 (which are in turn arranged in a ring along a circumference pf smaller diameter) and defining the outlet port of the at least one first reaction product P1_OUT; the first plurality of passage channels 22, 38 and the second plurality of passage channels 24, 40 are moreover in a relation of heat exchange with one another on account of the thermally conductive material of which the end cap 4 is made;

the second end cap 6 includes a third plurality of passage channels 58, 74 (coaxial in pairs and in fluid communication with one another) arranged in a ring around the longitudinal axis X1 of the shell 2 and defining the inlet port of the at least one first reactant R1_IN, and a fourth plurality of passage channels 56, 65 (coaxial in pairs and in fluid communication with one another), which are arranged in a ring around the third plurality of passage channels 58, 74 and define the inlet port of the at least one second reaction product P2_OUT; the third plurality of passage channels 58, 74 and the fourth plurality of passage channels 56, 65 are moreover in a relation of heat exchange with one another on account of the thermally conductive material of which the end cap 6 is made.

The heat-conditioning units 12 are fitted on the outside of the portions 132 and 136 in the proximity of the ends 148 and 138, i.e., in the proximity of the end caps 4 and 6. In some embodiments, the heat-conditioning units 12 may be omitted or else may be provided only at one of the two head ends of the reactor 1.

Figure 2:
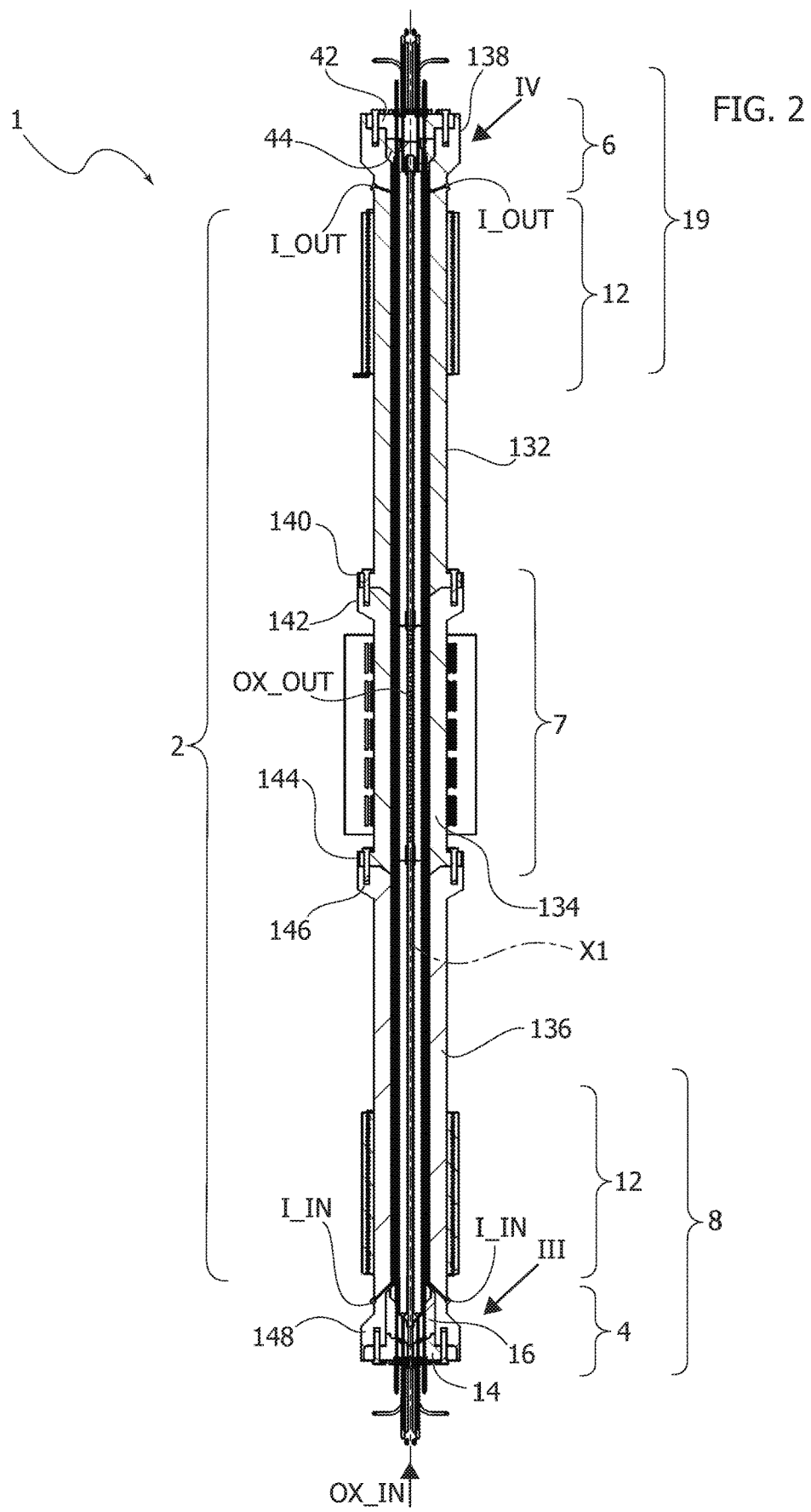
FIG. 2 is a longitudinal section of the reactor of FIG. 1.

Finally, with reference to FIG. 2, around the reaction core 7 the heat exchanger HT (which may be of an electrical type or generically of any nature) is used only in the starting stage for bringing the reaction core 7 itself to a temperature close to the operating temperature. In steady-state conditions, according to the type and chemical composition of the waste supplied, the heat exchanger HT can carry a thermal flow necessary for supplying the surplus heat necessary to sustain the gasification reaction.

Operation of the reactor 1 is described in what follows.

The reactor 1 is functionally a combined reactor within which oxidation reactions in supercritical water and gasification reactions in supercritical water can be obtained simultaneously. The oxidation reaction in supercritical water takes place within the volume V1 and involves the at least one first reactant R1 fed through the ports R1_IN and the oxidizer agent fed through the port OX_IN. The gasification reaction in supercritical water takes place, instead, within the volume V2 and involves the at least one second reactant R2 fed through the ports R2_IN and a thermal flow at inlet to the volume 2 due to the fact that the oxidation reaction in supercritical water is exothermic.

Moreover supplied to the reactor 1 is a continuous flow of inert pressurized fluid through the holes 149IN that invades the volume V_IN and exits through the holes 149OUT. The function of the inert fluid within the volume V_IN is that of compensating the pressure existing within the system and thus enabling compensation from outside of the mechanical stresses on the intermediate wall (T3) due to phenomena internal thereto. In the second place, without this constituting a secondary aspect, the inert fluid in the volume V_IN provides protection from corrosion of the inner wall of the shell 2.

The pressure within the reaction volumes V1 and V2 is due to the operating pressure at which the systems of circulation of the flows R1_IN and R2_IN, together with the characteristics of the circulation network itself, pressurize the flows R1_IN and R2_IN. This pressure is maintained by the circulation system itself and by thermal-expansion valves set fluid-dynamically downstream of the reactor 1. The tubular elements T3 and T2 are preferably made of titanium alloy so as to be resistant to high temperatures, corrosion, and phenomena of embrittlement of the material in oxidizing and reducing environment, but are thin-walled elements. They are, in fact, designed simply for supporting thermal aggression and corrosion, but not to withstand major structural loads. For this reason, thanks to the concentric arrangement of the various volumes, the pressure existing within the volume V1 is compensated for by the pressure existing within the volume V2 during the gasification reaction in supercritical water.

The pressure existing within the volume V2 is moreover compensated for by the pressure of the inert fluid within the volume V_IN. This mechanism of self-compensation of the pressures straddling the walls of the tubular elements T2 and T3 enables them to withstand the stresses imposed without any failure.

The final action of compensation, which is to all effects an action of structural strength, is offered by the shell 2 and by the tubular element TC, which is thick-walled and is made of steel. The shell 2 is hence entrusted with the function of structural element that must withstand the action of the pressure within the volume V_IN compensated only by its own structural strength and by the relative contribution of the external atmospheric pressure.

Provision of the volume V_IN hence enables a first technical drawback of those mentioned at the start of the description to be overcome. In particular, it is possible to divide the function of resistance to corrosion and embrittlement (of a thermal nature and due to the presence of hydrogen $H_2$) and of pure and simple reaction volume from that of structural strength of a pure and simple containment volume. The first function is assigned to the tubular elements T1 to T3, whilst the second function is assigned to the tubular element TC that constitutes the shell 2. This represents a considerable economic saving in so far as the costly titanium and/or nickel-chromium alloys necessary for producing the tubular elements T1 to T3 can be applied to the production of thin-walled elements that require a smaller amount of material to be produced. The less expensive structural steel is instead used only for the component that effectively has a structural function, with a considerable increase of the economic competitivity of the reactor 1.

A typical example of operation is described hereinafter.

A flow of an oxidizer agent (e.g., oxygen, but also air, water with oxygen dissolved therein, peroxide, etc.) penetrates into the tubular element T1 through the port OX_IN. From this, the oxidizer agent spreads within the volume 1 through the holes H_OX that provide a diffuser of oxidizer agent (functionally an outlet port for the oxidizer agent). At the same time, the volume V1 is invaded by a flow of at least one reactant that passes through the port R1_IN. For instance, this at least one reactant may be an aqueous solution of dangerous organic waste. Again at the same time, a flow of at least one second reactant—for example, constituted once again by an aqueous solution of organic waste—enters through the ports R2_IN, traverses the sequence of the holes 24 and 40, and invades the volume V2.

The person skilled in the branch will appreciate that the flow of the at least one first reactant and the flow of the at least one second reactant are in countercurrent with respect to one another. In particular, the flow of the at least one first reactant (from R1_IN to P1_OUT) proceeds from the end cap 6 to the end cap 4, whilst the flow of the at least one second reactant (from R2_IN to P2_OUT) proceeds from the end cap 4 to the end cap 6. Furthermore, in this embodiment also the oxidizer that flows in the tubular element T1 is in countercurrent with respect to the flow of the at least one reactant.

The choice of having the flows in countercurrent enables the efficiency of the process to be maximized and is moreover functional to obtaining water in supercritical conditions with minimum energy expenditure. The aqueous solution that penetrates through the ports R1_IN and invades the volume V1 is initially pre-heated as a result heat exchange within the end cap 6 between the hot gaseous products exiting through the ports P2_OUT, which pass in the holes 65 and 56 that are located in the immediate vicinity of the holes 74 and 58.

Subsequently, this solution within the volume V1, in the stretch corresponding to the head portion 10 (FIG. 1) is further pre-heated through the wall T2 by the current circulating in the volume V2. In this way, this solution reaches the reaction core 7 in conditions that are already supercritical and can in this way react with the oxidizer agent that exits from the port OX_OUT, giving rise to the oxidation reaction in supercritical water, which is markedly exothermic. The products of the oxidation reaction in supercritical water then yield heat to the current that circulates in the volume V2 and abandon the reactor 1 through the ports P1_OUT, i.e., traversing the sequences of holes 38 and 22 in the end cap 4. Here there is a transfer of thermal energy to the flow of the at least one second reactant that flows towards the volume V2 through the ports R2_IN.

This flow passes in fact in the sequences of holes 24 and 40 that are in the immediate vicinity of the holes 22 and 38, enabling the water that makes up the aqueous solution that constitutes the at least one second reactant to enter the volume V2, pass along the stretch corresponding to the head portion 8, and be pre-heated so as to reach the reaction core 7 already in supercritical conditions. Owing to its marked exothermic nature, the oxidation reaction in supercritical water within the volume 1 releases a considerable amount of thermal energy, which that thanks to the fact that there is heat exchange between the walls of the tubular element T2 and the volume V2, as well as between the sequences of holes 24 and 40 and the sequences of holes 22 and 38 (which, being in the proximity, provide a heat exchanger with flows in countercurrent), is transferred to the fluid in the volume V2, thus supplying the heat necessary for triggering the gasification reaction in supercritical water.

The products of the gasification reaction in supercritical water abandon the reactor 1 through the end cap 6 according to the modalities described previously. Provision of the conditioning units 12 in the head portions 8, 10 of the reactor has as beneficial effect that of confining the hotter area of the reactor substantially at the reaction core 7, but, especially as regards the head of the reactor in the proximity of the end cap 4, the reduction of the temperatures within the reactor improves the solubility in water of the salts of the mineral acids released during the oxidation and gasification reactions preventing uncontrolled precipitation thereof on the bottom of the reactor 1 and consequently clogging of the ports provided on the end cap 4. Moreover this reduction in temperature enable use, also in the heads of the reactor 1, of materials that are of lower quality and hence less costly.

The person skilled in the branch will thus appreciate that the reactor 1 enables all the problems mentioned at the beginning of the description to be overcome. It solves in the first place the problem of division of the functions of structural strength and of resistance to corrosion thanks to provision of the volume V_IN. It solves the problem of clogging of the working ports of the reactor thanks to provision of the cooling units 12, and likewise renders competitive the entire process in so far as it is able to simultaneously host the reactions of oxidation in supercritical water and gasification in supercritical water, integrating them in a way that goes beyond mere juxtaposition, in particular exploiting synergistically the characteristics of one and the other to minimize the energy impact and maximize the efficiency.

The geometry of the reactor 1, and in particular the arrangement of the volume V1, where there takes place the oxidation reaction in a central position with respect to the reactor, and the choice of introducing the reactants for oxidation (the at least one first reactant) from above leads the solid particles possibly present to traverse the entire reactor by gravity from the top down.

Furthermore, the choice of arranging the volume V2 (where there takes place the gasification reaction) in the external part of the core of the reactor 1 and of assigning thereto a contained radial encumbrance, enables transport of the ashes upwards.

It is, however, to be borne in mind that the various technical solutions that equip the reactor may in principle be rendered independent of one another and form the subject singly of reactors with lower complexity, which present one or more, but not all, the advantages of the reactor 1, and are suited to use as reactors in less complex systems or as partial reactors for some chemical species in complex and non-complex systems.

Figure 11:
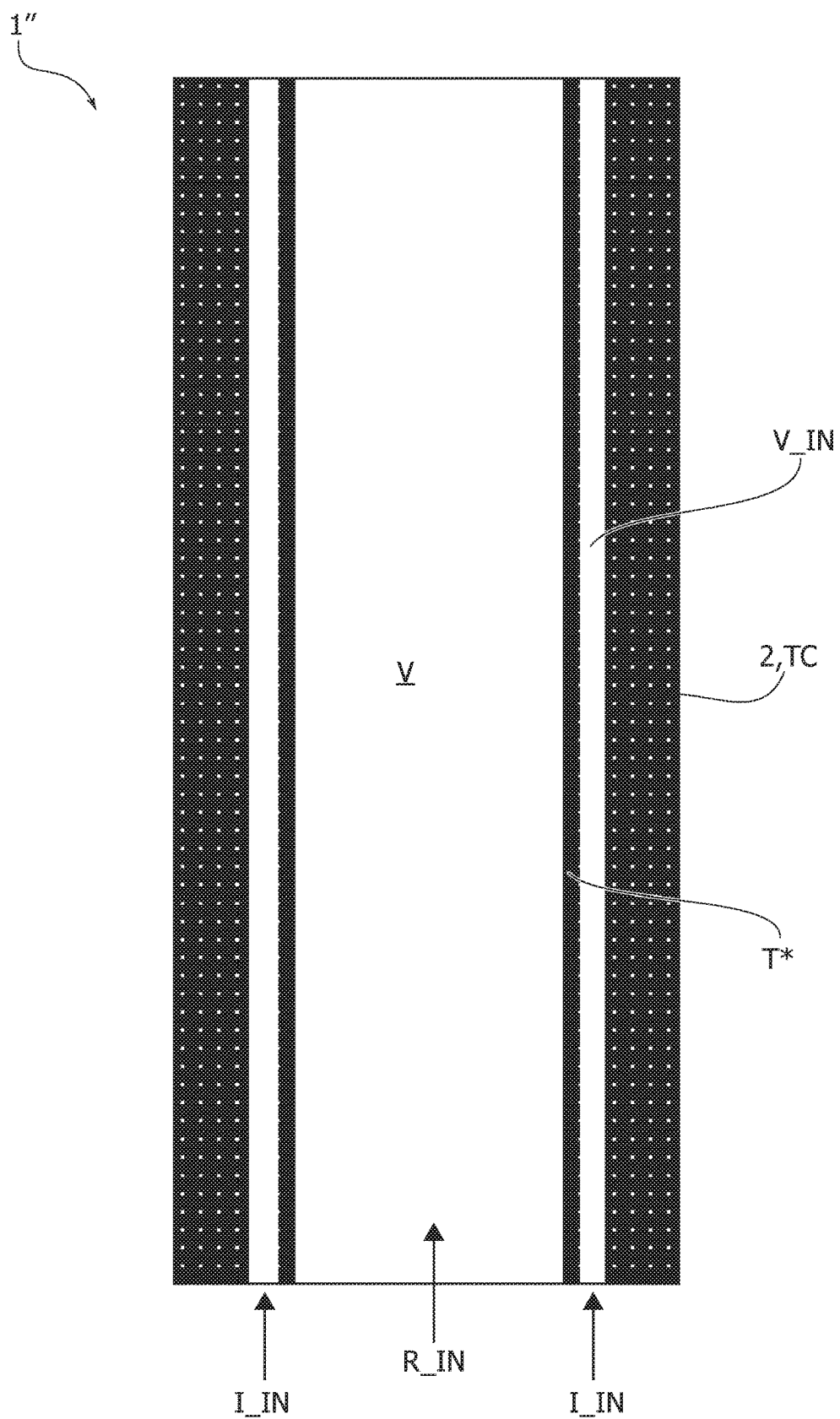

Examples of these reactors are illustrated in FIGS. 9 to 11.

FIG. 9 is a principle diagram that corresponds to the operation of the reactor 1, but is without conditioning units 12. Once again, the reactor of FIG. 9 can be provided by getting the tubular elements TC and T3 to coincide, thus eliminating the volume V_IN that functions as pressure-compensation chamber.

The reactor of FIG. 10 is, instead, a reactor, designated by the reference number 1', in which a single reaction volume V* is present provided by means of a tubular element T*, defined around which is a volume V_IN. In the volume V_IN there is introduced a pressurized inert fluid that provides the pressure compensation described previously.

The reactor 1' is equipped with the cooling units 12 (one or more according to the end at which they are arranged) and is primarily aimed at minimizing the risk of clogging of the reactor itself by deposition of precipitated salts. For this reason, an essential equipment of the reactor 1' is simply represented by cooling units 12, whilst the pressure-compensation chamber may be deemed in itself optional.

Finally, the reactor of FIG. 11 is designated by the reference 1" and has as essential equipment just the compensation chamber into which the inert pressurized fluid (volume V_IN) is introduced. In this case, both simultaneous provision of reaction volumes within which the reactions of oxidation and gasification in supercritical water take place simultaneously and provision of heat-conditioning units are to be deemed optional.

In this connection, the reactor 1 may be provided with removable and/or interchangeable components for adaptation to the various configurations of FIGS. 9 to 11 according to the needs.

These needs are listed in what follows (without this constituting an exhaustive list):

simultaneous occurrence of the reactions of oxidation in supercritical water and gasification in supercritical water, a need that is met by the reactor of FIG. 9, where the pressure-compensation chamber and the heat-conditioning units are optional characteristics;

minimization of the risk of clogging of the ports of the reactor via provision of heat-conditioning units that concentrate the hotter area in the median part of the reactor (reaction core), lowering the temperatures at one or both of the head portions to increase the solubility of the salts of the mineral acids within the reaction water, a need that is met by the reactor 1' of FIG. 10; and separation of the functions of resistance to stresses of a thermal and chemical nature from the functions of structural strength thanks to the provision of a pressure-compensation chamber between the structural shell and the shell that houses the reaction volume, a need that is met by the reactor 1" of FIG. 11.

The above needs may in fact present both in a concentrated way and in a separate way, meaning thereby that the constraints set by meeting one need may prove prevalent over the constraints deriving from meeting of the other needs.

The reactor 1, for example, is well suited to use in a complex system such as the one described in the Italian patent application No. 102015000011686 filed in the name of the present applicant. In this case, the reactor 1 would simultaneously perform at least the functions of reactor for oxidation in supercritical water and of reactor for gasification in supercritical water described therein. In reference to the aforesaid Italian patent application, two reactors are present, in the case in point an oxidation reactor in supercritical water and a gasification reactor in supercritical water. At least one aqueous current that transfers thermal energy from the oxidation reactor in supercritical water to the gasification reactor in supercritical water traverses in series the two reactors (thermal integration). Furthermore, at least two organic currents of waste are supplied flowing in parallel through the oxidation reactor in supercritical water and through the gasification reactor in supercritical water so as to send selectively each of these organic currents of waste on to one or the other reactor, according to the characteristics thereof.

To provide a correspondence, according to the present invention the aqueous current flows in series through the volume V2 and the volume V1. These volumes are at the same time supplied by at least two organic currents of waste with flow in parallel through the volume V1 (oxidation in supercritical water) and through the volume V2 (gasification in supercritical water), by selectively sending each organic current of waste on to one or the other of the two volumes V1, V2 according to their properties, in particular as regards the gasifiability of the currents themselves.

However, in the case of systems of lower complexity and/or of reactors for partial reactions, the need to separate the functions of structural strength and of resistance to thermochemical aggression, or the need to prevent precipitation of salts on the bottom of the reactor, or the need of house simultaneously two reactions (distinct reactions or successive stages of one and the same reaction) may become more pressing. It is for this reason that in these circumstances there enter into play the reactors of FIGS. 11, 10, and 9 (possibly in combination with one another) in order to meet the specific needs.

Finally, it should be noted that a further advantage of the reactor 1 according to the invention consists in the fact that the thermal energy propagates both in an axial direction and in a radial direction. This leads to having the centre of the reaction core hot and the walls cold both longitudinally and radially. This enables—as already mentioned—the use of materials of lower quality from the standpoint of thermal resistance.

Of course, the details of construction and the embodiments may vary widely with respect to what has been described and illustrated herein, without thereby departing from the scope of the present invention, as defined by the annexed claims.

In this connection, with reference to FIGS. 9A-9C, the embodiments illustrated herein may be provided with a supply system for the oxidizer (or of the comburent) of the type illustrated in the figures themselves.

The characteristic underlying this system is the possibility of varying the point of injection of the oxidizer/combustion air at inlet to the first reaction volume V1, where the oxidation reactions take place.

In particular, the inventors have noted how, in order to guarantee a maximum temperature inside the reactor that is invariant with respect to the treated flows (R1_IN, R2_IN), it is necessary to supply the oxidizer/comburent (air) at different heights as operational regime varies. For the purposes of the process, the flows circulating in the oxidation chamber (volume V1) and in the gasification chamber (volume V2) are approximately in a relation of direct proportionality with respect to one another in so far as, in the face of an increase of the flow R1_IN to be oxidized (which requires, by itself, a greater flow of combustion air), it is necessary to increase also the flow of dispersion to be gasified R2_IN, to be able to absorb the greater thermal power developed by oxidation.

In particular, the inventors have noted that, with the increase of the flows R1_IN, R2_IN, it is necessary to approach the point of injection of the oxidizer/comburent to the inlet point OX_IN, to cause the greater flow of oxidizer/comburent to distribute more evenly and in a greater volume.

The solution identified to achieve what has been set forth above consists in replacement of the tubular element T1 with an ensemble of tubular elements illustrated schematically in FIGS. 9A and 9B. In particular, the tubular element T1 is replaced by five distinct tubular elements T1_0, T1_1, T1_2, T1_3, T1_4, where the tubular element T1_0 is similar (or, in some embodiments, identical), to the element T1, above all in terms of axial development.

In particular, each of the elements T1_1, T1_2, T1_3, T1_4 includes a first end at the inlet port of the oxidizer agent OX_IN (which provides itself a respective inlet port of oxidizer agent for the corresponding tubular element), and a second end that defines a respective outlet port for the oxidizer agent OX_OUT1, OX_OUT2, OX_OUT3, OX_OUT4.

The outlet port for the oxidizer agent OX_OUT1, OX_OUT2, OX_OUT3, OX_OUT4 of each further tubular element T1_1, T1_2, T1_3, T1_4 occupies a different position along the axial length of the first tubular element T1_0.

Like the tubular element T1, the element T1_0 has an injection band consisting of a portion of surface provided with a plurality of radial through holes that extends from the position L01 to the position L02 along the axis of the tubular element T1_0 itself.

The elements T1_1, T1_2, T1_3, T1_4 are arranged internally with respect to the element T1_0, and also set internally with respect to the element T1_0 are four divider plates DP1, DP2, DP3, DP4 that divide the injection band into five distinct chambers, coming under which are the outlet ports of as many tubular elements.

In particular, with reference to FIG. 9A, denoting by L the length of the tubular element T1_0 (which has a location and dimensions similar to those of the tubular element T1 in the embodiment already described, which—if modified in this sense—can itself function as element T1_0), and likewise introducing the following references:

L01: beginning of injection band on tubular element T1_0

L02: end of injection band on tubular element T1_0

L1: axial position of the point of injection/outlet port for the oxidizer agent OX_OUT_1, coming under which is the tubular element T1_1

L2: axial position of the point of injection/outlet port for the oxidizer agent OX_OUT_2, coming under which is the tubular element T1_2

L3: axial position of the point of injection/outlet port for the oxidizer agent OX_OUT_3, coming under which is the tubular element T1_3

L4: axial position of the point of injection/outlet port for the oxidizer agent OX_OUT_4, coming under which is the tubular element T1_4, in the embodiment represented in the aforesaid figures the following relations are verified:

the injection band, i.e., the band of the tubular element T1 where the flows of oxidizer/comburent injected by means of the tubular elements T1_1, T1_2, T1_3, T1_4 give out, extends between the ends L01 and L02 located, respectively, in a position corresponding to 20% of the length L and to 57.5% of the length L (in general L01 ranges between 15% and 25% of L, whilst L02 ranges between 50% and 65% of L);

the position L1 is at 27.5% of the length L (in general, between 20% and 30%);

the position L2 is at 32.5% of the length L (in general from 30% to 35%, in any case provided that L2>L1);

the position L3 is at 37.5% of the length L (in general, from 35% to 40%, in any case provided that L3>L2);

the position L4 is at 45% of the length L (in general from 40% to 50%, in any case provided that L02>L4>L3).

The position reference, in each of the cases referred to above, has been assumed to be the end of the element T1_0 at which the port OX_IN is located.

The first divider plate DP1 is substantially located at the position L1 (flush with the port OX_OUT1 or else slightly underneath it, according to the needs of installation), and defines a first chamber C0 that extends from L01 to L1. This chamber enables injection of oxidizer agent/comburent fed through just the element T1_0 through the holes of the injection band that are located in the corresponding portion.

The second divider plate DP2 is substantially located at the position L2 (flush with the port OX_OUT2 or else slightly underneath it, according to the needs of installation), and defines a second chamber C2 that extends from L1 to L2. This chamber enables injection of oxidizer agent/comburent fed through just the element T1_2 through the holes of the injection band that are located in the corresponding portion.

The third divider plate DP3 is substantially located at the position L3 (flush with the port OX_OUT3 or else slightly underneath it, according to the needs of installation), and defines a third chamber C3 that extends from L2 to L3. This chamber enables injection of oxidizer agent/comburent fed through just the element T1_3 through the holes of the injection band that are located in the corresponding portion.

The fourth divider plate DP4 is substantially located at the position L4 (flush with the port OX_OUT4 or else slightly underneath it, according to the needs of installation), and defines a fourth chamber C4 that extends from L3 to L4. This chamber enables injection of oxidizer agent/comburent fed through just the element T1_4 through the holes of the injection band that are located in the corresponding portion.

Preferably, a further divider plate DP0 is set in the position L02 for closing axially the injection band and hence delimiting the chamber C4.

In this way, by supplying only the element T1_4, introduction of the oxidizer/comburent into the volume V1 takes place exclusively through the chamber C4.

Likewise, by supplying the element T1_4 and the element T1_3, introduction of the oxidizer/comburent into the volume V1 takes place exclusively through the chambers C4, C3.

Once again, by supplying the elements T1_4, T1_3, T1_2, introduction of the oxidizer/comburent into the volume V1 takes place exclusively through the chambers C4, C3, C2.

By supplying the elements T1_4, T1_3, T1_2, T1_1, introduction of the oxidizer/comburent into the volume V1 takes place exclusively through the chambers C4, C3, C2, C1.

Finally, by supplying all five tubular elements T1_4, T1_3, T1_2, T1_1, T1_0, introduction of the oxidizer/comburent into the volume V1 takes place through all the chambers C4, C3, C2, C1, C0, so that the oxidizer/comburent is supplied to the volume V1 (oxidation volume) along the entire injection band of the element T1_0. In any case, the perforated walls of the injection band constitute the points of injection of the oxidizer/comburent for each chamber C4, C3, C2, C1, C0.

Five independent injection bands (the overall extension of which is equal to the injection band on the element T1_0) for oxidizer/comburent are in effect provided, all of which are fed through the corresponding port OX_IN. It should moreover be noted that, in general, the number of the tubular elements within the element T1_0 may differ from the four described above. A relation applies whereby with N tubular elements inside the element T1_0 there are N+1 independent chambers isolated from one another (here, the chambers C0, C1, C2, C3, C4). Even more in general, the first tubular element T1_0 includes an injection band that extends from L01 to L02 and is configured for inlet of oxidizer/comburent into the first reaction volume V1. The injection band is divided into a plurality of chambers (here C0, C1, C2, C3, C4) isolated from each other, where:

a first chamber of said plurality is configured for receiving a flow of oxidizer agent fed through the first tubular element T1_0 and for introducing the same flow into the first reaction volume (V1) through a corresponding portion of the injection band; and each further chamber of said plurality is configured for receiving a flow of oxidizer agent fed through the outlet port of the oxidizer agent (here OX_OUT1, OX_OUT2, OX_OUT3, OX_OUT4) of a corresponding one of the further tubular elements (here T1_1, T1_2, T1_3, T1_4) and for introducing the respective flow of oxidizer agent into the first reaction volume V1 through a corresponding portion of said injection band.

During operation, it is thus possible to introduce the oxidizer/comburent into the volume V1 by means of one or more of the tubular elements T1_0, T1_1, T1_2, T1_3, T1_4, with the overall effect of varying the height of introduction and the amplitude of the portion of the injection band through which the oxidizer/comburent is introduced into the volume V1, enabling efficient and precise control of the performance of the process in so far as there is in effect obtained a thermal conditioning of the currents and of the volumes of the areas of reaction and heat exchange.

This arrangement is useful both for purposes of safety, limiting the maximum temperature reached in combustion during oxidation, and for purposes of process efficiency, providing an effective volume of reaction that increases as the flows treated increase, without jeopardizing excessively the residence times and, consequently, the gasification yield.

In the tubular elements not used, instead of the oxidizer/comburent, a small flow of pressurized water or carbon dioxide or other inert fluid is supplied so as to prevent reflux of the organic sewage fed to the oxidation section (volume V1) through the injection ports for the oxidizer/comburent.

In the case of simultaneous supply of two or more of the tubular elements T1_0, T1_1, T1_2, T1_3, T1_4, the flow of oxidizer/comburent is preferably divided into equal shares between the tubular elements supplied.

In this embodiment, the reactor 1 is equipped, on top of the oxidation chamber, with a separator diaphragm SW, which is fitted coaxially to the first tubular element (T1_0) and is axially slidable along it and with respect to the second tubular element T2. The diaphragm SW is configured for partitioning the first reaction volume V1 and for this purpose can be repositioned (during maintenance operations, with the reactor open) in the axial direction thereof. The diaphragm SW has the function of physically segregating the region above it, where heat exchange takes place exclusively between the relatively cold current R1_IN and the adjacent hot current P2_OUT of outgoing gasified fluid, from the region below it, where interaction of the flow R1_IN with the oxidizer/comburent, and hence the ensemble of oxidation reactions, takes place.

The diaphragm SW prevents turbulent motions of natural recirculation, caused by the difference in density due to the marked radial thermal gradients, from causing hot fluid fillets to ascend the entire reactor, as far as the head, thus jeopardizing the proper operation envisaged for the terminal head portion of the reactor, which, as has already been said, is functional for heat exchange between the currents.

The diaphragm SW consequently functions as a sort of breakwater, which forces the flows inside the volume V1 (due to natural convection) to close on themselves, thus preventing the head of the reactor from being reached.

The diaphragm SW must not constitute total obstruction in regard to the flow R1_IN (typically carbon slurry), which flows from top down in the volume V1, so that it must be provided with holes and/or through slits, or else must have an outer diameter smaller than the inner diameter of the tubular element T2, where it is located, so as to leave a gap for passage of the flow R1_IN.

In this way, the overall descending motion of the fluid current R1_IN (due to forced convection) is not jeopardized, but the effects of natural convection are limited or cancel out in the region concerned by introduction of the oxidizer/comburent.

According to an advantageous aspect of the invention, which is common to all the embodiments described, technical measures are envisaged aimed at guaranteeing cooling and protection from corrosion of the wall of the element TC, which constitutes the shell resistant to the internal pressure. This task is performed by the current of carbon dioxide, or of other inert chemical species (flow I_IN), sent into the narrow gap V_IN.

From a process standpoint, in addition to that of safety, the pressure profile existing in the reactor is such that the pressure decreases, in a radial direction, from the outside towards the axis of the reactor. More specifically, the pressure in the chamber V_IN is higher than the pressure in the volume V2 where gasification takes place, this pressure being in turn higher than the pressure in the volume V1 where oxidation takes place.

In this way, any possible fluid leakage (wherever this may be located along the entire reactor) may occur exclusively from a volume/chamber that is more external to a volume/chamber that is more internal, under the action of the pressure difference.

The wall of the element TC, which is the only one effectively resistant to the internal pressure, is thus always in contact with an inert fluid (typically carbon dioxide) that provides cooling and protection against corrosion. The intermediate chamber (volume V2—gasification) may be "polluted" exclusively by inert fluid, which does not adversely affect the process in so far as it is already present in the volume V2 as product of gasification, nor does it present any risks as regards safety in so far as it is chemically inert. The innermost chamber (volume V1—oxidation) may be "polluted" just by the reactants and/or by the products of gasification, which, since they are combustible, would react rapidly with the excess of oxidizer/comburent supplied into the oxidation chamber, thus consuming all or part of the oxygen present.

The effects of this eventuality would be immediately perceived and managed safely by the control system of the reactor.

The invention claimed is:

1. A process for operating a multi-function supercritical water reactor, the reactor comprising:
    a reactor shell defining a first supercritical water oxidation reaction chamber and a second supercritical water gasification reaction chamber that is isolated from the first supercritical water oxidation reaction chamber by a partition;

an oxidizer agent inlet port in fluid communication with the first supercritical water oxidation reaction chamber and blocked by the partition from fluid communication with the second supercritical water gasification reaction chamber;

a first reactant inlet port in fluid communication with the first supercritical oxidation reaction chamber and blocked by the partition from fluid communication with the second supercritical water gasification reaction chamber;

the first supercritical water oxidation reaction chamber having an outlet port for a first reaction product from the supercritical water oxidation reaction;

a second reactant inlet port in fluid communication with the second supercritical water gasification reaction chamber;

the second supercritical water gasification reaction chamber having an outlet port for a second reaction product from the supercritical water gasification reaction chamber;

the partition being operative to exchange thermal energy between the first supercritical water oxidation reaction chamber and second supercritical water gasification reaction chamber;

wherein the process comprises hosting an exothermic oxidation reaction in the first supercritical water oxidation reaction chamber between the first reactant and the oxidizer agent with the resulting formation of the first reaction product, and hosting an endothermic gasification reaction in the second supercritical water gasification reaction chamber with the contribution of the thermal energy flowing through the partition from the first supercritical water oxidation reaction chamber to the second supercritical water gasification reaction chamber with the resulting formation of the second reaction product.

2. The process of claim 1, wherein the second supercritical water gasification reaction chamber surrounds the first supercritical water oxidation reaction chamber with the partition therebetween.

3. A process for operating a reactor (1), the reactor (1) including:

a first tubular element (T1) in fluid communication with the inlet port for an oxidizer agent (OX_IN) and including furthermore an outlet port for said oxidizer agent (OX_OUT), a second tubular element (T2) arranged around said first tubular element (T1) so as to define therebetween the first reaction volume (V1), a third tubular element (T3) arranged around said second tubular element (T2) so as to define therebetween said second reaction volume (V2), a partition isolating the second reaction volume from the first reaction volume and also from fluid communication with the inlet port for the oxidizer agent, and wherein the partition includes the second tubular element (T2), a first reaction volume (V1), a second reaction volume (V2), wherein:

the first reaction volume (V1) is in fluid communication with an inlet port for an oxidizer agent (OX_IN), an inlet port for at least one first reactant (R1_IN) and an outlet port for at least one reaction product (P1_OUT), said second reaction volume (V2) is in fluid communication with an inlet port for at least one second reactant (R2_IN), an outlet port for at least one second reaction product (P2_OUT), and is furthermore in thermal exchange relationship with said first reaction volume (V1), wherein the process comprises, hosting, in said first reaction volume (V1), an oxidation reaction between said at least one first reactant and said oxidizer agent with the formation of said at least one first reaction product, and hosting, in said second reaction volume (V2), a gasification reaction, said second reactant in the absence of the oxidizer agent associated with the first reaction volume and with the contribution of a thermal energy flow exchanged between the first and the second reaction volumes (V1, V2) with formation of said at least one second reaction product.

4. The process according to claim 3, wherein said oxidation reaction is a supercritical water oxidation reaction, while said gasification reaction is a supercritical water gasification reaction.

5. The process according to claim 3, wherein said first reaction volume (V1) and said second reaction volume (V2) are arranged concentric with one another.

6. The process according to claim 3, wherein the flow of said at least one first reactant is in counter-current with respect to the flow of said at least one second reaction product, and wherein the flow of said at least one second reactant is in counter-current with the flow of said at least one first reaction product.

7. The process according to claim 6, the reactor (1) including a shell (2) inside of which said first (V1) and second (V2) reaction volumes are arranged, and a first (4) and a second (6) end caps axially delimiting said shell (2), wherein in correspondence of said first end cap (4) there are provided said inlet port for an oxidizer agent (OX_IN), said inlet port for said at least one reactant (R1_IN), and said outlet port for said at least one second reaction product (P2_OUT), and wherein in said second end cap (6) there are provided said inlet port for said at least one second reactant (R2_IN) and said outlet port for said at least one first reaction product (P1_OUT).

8. The process according to claim 3, wherein said shell (2) is arranged around said third tubular element (T3) so as to define an annular chamber (V_IN) configured to house an inert fluid.

9. The process according to claim 6, the reactor (1) including a shell (2) axially delimited by means of a first end cap (4) and a second end cap (6) arranged at opposite ends thereof, wherein:

said first end cap (4) includes the inlet port of said oxidizer agent (OX_IN) in a position substantially coaxial to a longitudinal axis (X1) of said shell (2), a first plurality of flow channels (24, 40) arranged ringwise around said inlet port for said oxidizer agent (OX_IN) and defining the inlet port for said at least one reactant (R1_IN), and the second plurality of flow channels (22, 38) arranged ringwise around said first plurality of flow channels (24, 40) and defining the outlet port for said at least one second reaction product (P2_OUT), the first plurality of flow channels (22, 38) and the second plurality of flow channels (24, 40) being in thermal exchange relationship with each other, said second end cap (6) includes a third plurality of flow channels (58, 74) ringwise arranged around the longitudinal axis of the casing (2) and defining the inlet port of said at least one second reactant (R2_IN), and a fourth plurality of flow channels (56, 65) ringwise arranged around said third plurality of flow channels (58, 74) and defining the inlet port of said at least one second reactant (R2_IN), the third plurality of flow channels (58, 74) and the fourth plurality of flow channels (56, 65) being in thermal exchange relationship therebetween.

10. The process according to claim 3, wherein said first tubular element (T1), second tubular element (T2) and third tubular element (T3) are thin-wall tubular elements, and wherein said shell (2) is provided as a thick-wall tubular element (TC).

11. The process according to claim 7, the reactor (1) including a first head portion (8) arranged in correspondence of said first end cap (4), a second head portion (10) arranged in correspondence of said second end cap (6) and a reaction core (7) comprised between a first head portion (8) and the second head portion (10),
the reactor (1) including a thermal conditioning unit (12) arranged in correspondence of at least one of said first and second head portion (8, 10).

12. The process according to claim 3, wherein said first tubular element (T1_0) houses internally a plurality of further tubular elements (T1_1, T1_2, T1_3, T1_4), each having a first end in correspondence of said inlet port of said oxidizer agent, and a second end that defines a respective outlet port of said oxidizer agent (OX_OUT1, OX_OUT2, OX_OUT3, OX_OUT4),
wherein the outlet port of the oxidizer agent of each further tubular element (T1_1, T1_2, T1_3, T1_4) occupies a different position along the axial length of the first tubular element (T1_0).

13. The process according to claim 12, wherein said first tubular element (T1_0) includes an injection band (L01, L02) configured for inlet of said oxidizer agent into said first reaction volume (V1), said injection band being divided into a plurality of chambers (C0, C1, C2, C3, C4) isolated from each other, wherein:
a first chamber of said plurality is configured for receiving a flow of oxidizer agent fed through said first tubular element (T1_0) and for introducing the same flow into said first reaction volume (V1),
each further chamber of said plurality is configured for receiving a flow of oxidizer agent fed through the outlet port of the oxidizer agent (OX_OUT1, OX_OUT2, OX_OUT3, OX_OUT4) of a corresponding one of said further tubular elements (T1_1, T1_2, T1_3, T1_4) and for introducing the respective flow of oxidizer agent into said first reaction volume (V1) through a corresponding portion of said injection band.

14. The process according to claim 13, the reactor including four further tubular elements and wherein, named:
L: axial length of the first tubular element (T1_0),
L01: beginning of the injection band on said first tubular element (T1_0),
L02: end of the injection band on said first tubular element (T1_0),
L1: axial position of the outlet port of the oxidizer agent of a first further tubular element (T1_1),
L2: axial position of the outlet port of the oxidizer agent of a second further tubular element (T1_2),
L3: axial position of the outlet port of the oxidizer agent of a third further tubular element (T1_3), and
L4: axial position of the outlet port of the oxidizer agent of a fourth further tubular element (T1_4),
the following relationships apply:
L01 ranges between 15% and 25% of L, whilst L02 ranges between 50% and 65% of L;
the position L1 is located between 20% and 30% of the length L;
the position L2 is located between 30% and 35%, of the length L, with L2>L1;
the position L3 is located between 35% and 40% of the length L, with L3>L2; and
the position L4 is located between 40% and 50% of the length L, with L02>L4>L3.

15. The process according to claim 14, the reactor including:
a first divider plate (DP1) set in correspondence of the position L1 and defining a first chamber (C0) that extends from L01 to L1;
a second divider plate (DP2) set in correspondence of the position L2 and defining a second chamber (C2) that extends from L1 to L2;
a third divider plate (DP3) set in correspondence of the position L3 and defining a third chamber (C3) that extends from L2 to L3; and
a fourth divider plate (DP4) set in correspondence of the position L4 and defining a fourth chamber (C4) that extends from L3 to L4.

16. The process according to claim 12, the reactor further including a separator diaphragm (SW), which is fitted coaxially on said first tubular element (T1_0) and is axially slidable along it and with respect to said second tubular element, said diaphragm (SW) being configured for partitioning the first reaction volume (V1) and being moreover configured for enabling a flow transit of said at least one first reactant (R1_IN) therethrough.

17. The process according to claim 5, wherein the second reaction volume (V2) is arranged around the first reaction Volume (V1).

18. The process according to claim 8, wherein the inert fluid is a pressurized inert fluid.

* * * * *